(12) United States Patent
Sarwer et al.

(10) Patent No.: US 11,825,122 B2
(45) Date of Patent: Nov. 21, 2023

(54) METHOD AND APPARATUS FOR PROCESSING VIDEO CONTENT WITH ALF AND CCALF

(71) Applicant: ALIBABA GROUP HOLDING LIMITED, Grand Cayman (KY)

(72) Inventors: Mohammed Golam Sarwer, Cupertino, CA (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/329,038

(22) Filed: May 24, 2021

(65) Prior Publication Data

US 2021/0368210 A1 Nov. 25, 2021

Related U.S. Application Data

(60) Provisional application No. 63/028,615, filed on May 22, 2020.

(51) Int. Cl.
*H04N 19/70* (2014.01)
*H04N 19/117* (2014.01)
*H04N 19/82* (2014.01)
*H04N 19/169* (2014.01)
*H04N 19/132* (2014.01)
*H04N 19/30* (2014.01)
(Continued)

(52) U.S. Cl.
CPC .......... *H04N 19/70* (2014.11); *H04N 19/117* (2014.11); *H04N 19/124* (2014.11); *H04N 19/132* (2014.11); *H04N 19/172* (2014.11); *H04N 19/174* (2014.11); *H04N 19/186* (2014.11); *H04N 19/188* (2014.11); *H04N 19/30* (2014.11); *H04N 19/82* (2014.11)

(58) Field of Classification Search
None
See application file for complete search history.

(56) References Cited

U.S. PATENT DOCUMENTS

2021/0176501 A1* 6/2021 Chen .................... H04N 19/46
2021/0314579 A1* 10/2021 Hu ........................ H04N 19/82
(Continued)

FOREIGN PATENT DOCUMENTS

| WO | WO 2019/060443 A1 | | 3/2019 |
| WO | PCT/CN2020/078770 | * | 3/2020 |
| WO | WO 2020/056352 A1 | | 3/2020 |

OTHER PUBLICATIONS

Kaser et al., "AhG 9: On APS and GDR constraint Flags", Joint Video Experts Team (JVET) of ITU-T SG 16 WP 3 and ISO/IEC JTC 1/SC 29/WG 11, JVET-R0178, 18th Meeting: by teleconference, Apr. 15-24, 2020. (Year: 2020).*

(Continued)

*Primary Examiner* — Stuart D Bennett
(74) *Attorney, Agent, or Firm* — Finnegan, Henderson Farabow, Garrett & Dunner, LLP

(57) ABSTRACT

The present disclosure provides systems and methods for processing video content. The method can include: receiving a bitstream comprising video content; determining whether a first signal associated with the video content satisfies a given condition; and in response to the determination that the first signal satisfies the given condition, disabling both a cross component adaptive loop filter (CCALF) process and a chroma adaptive loop filter (ALF) process.

18 Claims, 36 Drawing Sheets

(51) Int. Cl.
*H04N 19/172* (2014.01)
*H04N 19/174* (2014.01)
*H04N 19/124* (2014.01)
*H04N 19/186* (2014.01)

(56) References Cited

U.S. PATENT DOCUMENTS

2022/0329794 A1* 10/2022 Kotra .............. H04N 19/174
2022/0345697 A1* 10/2022 Choi ............... H04N 19/18
2023/0043717 A1*  2/2023 Deng .............. H04N 19/176

OTHER PUBLICATIONS

Bross et al., "Versatile Video Coding (Draft 9), "JVET-R2001-vB, 18th Meeting: by teleconference, Apr. 15-24, 2020, 523 pages.
Chen et al., "Algorithm Description of Joint Exploration Test Model 7 (JEM 7)," JVET-G1001-v1, $7^{th}$ Meeting: Torino, IT, Jul. 13-21, 2017, 50 pages.
Chen et al., "Algorithm Description of Joint Exploration Test Model 8 (JEM 8)," JVET-Q2002-v1, $17^{th}$ Meeting: Brussels, BE, Jan. 7-17, 2020, 91 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Segall et al., "Joint Call for Proposals on Video Compression with Capability beyond HEVC," JVET-H1002 (v6), $8^{th}$ Meeting: Macao, CN, Oct. 18-24, 2017, 27 pages.
Sullivan et al., "Overview of the High Efficiency Video Coding (HEVC) Standard," IEE Transactions on Circuits and Systems for Video Technology, vol. 22, No. 12, pp. 1649-1668 (2012).
Misra et al., "On Cross Component Adaptive Loop Filter for Video Compression," IEEE, 2019 Picture Coding Symposium (PCT), Nov. 12-15, 2019, 5 pages.
PCT International Search Report and Written Opinion dated Aug. 26, 2021, issued in corresponding International Application No. PCT/US2021/033941 (7 pgs.).

* cited by examiner

Example SPS syntax

| seq_parameter_set_rbsp( ) { | Descriptor |
|---|---|
|   sps_alf_enabled_flag | u(1) |
|   if( sps_alf_enabled_flag && ChromaArrayType != 0 ){ | |
| 601     sps_chroma_alf_enabled_flag | u(1) |
| 602     sps_ccalf_enabled_flag | u(1) |
|   } | |
| } | |

FIG. 6

Example PH syntax

| picture_header_structure( ) { | Descriptor |
|---|---|
|   if( sps_alf_enabled_flag && pps_alf_info_in_ph_flag ) { | |
|     ph_alf_enabled_flag | u(1) |
|     if( ph_alf_enabled_flag ) {       701 | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 && sps_chroma_alf_enabled_flag) { | |
|         ph_alf_cb_flag | u(1) |
|         ph_alf_cr_flag | u(1) |
|       } | |
|       if( ph_alf_cb_flag \|\| ph_alf_cr_flag ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag )   702 | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
| } | |

FIG. 7

Example SH syntax

| slice_header( ) { | Descriptor |
|---|---|
|   if( sps_alf_enabled_flag && !pps_alf_info_in_ph_flag ) { | |
|     sh_alf_enabled_flag | u(1) |
|     if( sh_alf_enabled_flag ) {     801 | |
|       sh_num_alf_aps_ids_luma | u(3) |
|       for( i = 0; i < sh_num_alf_aps_ids_luma; i++ ) | |
|         sh_alf_aps_id_luma[ i ] | u(3) |
|       if( ChromaArrayType != 0 && sps_chroma_alf_enabled_flag) { | |
|         sh_alf_cb_flag | u(1) |
|         sh_alf_cr_flag | u(1) |
|       } | |
|       if( sh_alf_cb_flag \|\| sh_alf_cr_flag ) | |
|         sh_alf_aps_id_chroma | u(3) |
|       if( sps_ccalf_enabled_flag ) { | |
|         sh_cc_alf_cb_enabled_flag | u(1) |
|         if( sh_cc_alf_cb_enabled_flag )    802 | |
|           sh_cc_alf_cb_aps_id | u(3) |
|         sh_cc_alf_cr_enabled_flag | u(1) |
|         if( sh_cc_alf_cr_enabled_flag ) | |
|           sh_cc_alf_cr_aps_id | u(3) |
|       } | |
|     } | |
|   } | |
| } | |

FIG. 8

Example PPS syntax

| pic_parameter_set_rbsp( ) { | Descriptor |
|---|---|
|   pps_chroma_tool_offsets_present_flag | u(1) |
|   if( pps_chroma_tool_offsets_present_flag ) { | |
|     pps_chroma_alf_enabled_flag | u(1) |
|   } | |

Example PH syntax

| picture_header_structure( ) { | Descriptor |
|---|---|
|   if( sps_alf_enabled_flag && pps_alf_info_in_ph_flag ) { | |
|     ph_alf_enabled_flag | u(1) |
|     if( ph_alf_enabled_flag ) {          1001 | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 && pps_chroma_alf_enabled_flag) { | |
|         ph_alf_cb_flag | u(1) |
|         ph_alf_cr_flag | u(1) |
|       } | |
|       if( ph_alf_cb_flag \|\| ph_alf_cr_flag ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag )    1002 | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
| } | |

FIG. 10

Example SH syntax

| slice_header( ) { | Descriptor |
|---|---|
|   if( sps_alf_enabled_flag && !pps_alf_info_in_ph_flag ) { | |
|     sh_alf_enabled_flag | u(1) |
|     if( sh_alf_enabled_flag ) {　　　　　　　　　　　　1101 | |
|       sh_num_alf_aps_ids_luma | u(3) |
|       for( i = 0; i < sh_num_alf_aps_ids_luma; i++ ) | |
|         sh_alf_aps_id_luma[ i ] | u(3) |
|       if( ChromaArrayType != 0 && pps_chroma_alf_enabled_flag) { | |
|         sh_alf_cb_flag | u(1) |
|         sh_alf_cr_flag | u(1) |
|       } | |
|       if( sh_alf_cb_flag \|\| sh_alf_cr_flag ) | |
|         sh_alf_aps_id_chroma | u(3) |
|       if( sps_ccalf_enabled_flag ) { | |
|         sh_cc_alf_cb_enabled_flag | u(1) |
|         if( sh_cc_alf_cb_enabled_flag )　　1102 | |
|           sh_cc_alf_cb_aps_id | u(3) |
|         sh_cc_alf_cr_enabled_flag | u(1) |
|         if( sh_cc_alf_cr_enabled_flag ) | |
|           sh_cc_alf_cr_aps_id | u(3) |
|       } | |
|     } | |
|   } | |
| } | |

FIG. 11

Example SPS syntax table

| seq_parameter_set_rbsp( ) { | Descriptor |
|---|---|
| sps_explicit_scaling_list_enabled_flag | u(1) |
| if( sps_lfnst_enabled_flag && sps_explicit_scaling_list_enabled_flag ) | |
| sps_scaling_matrix_for_lfnst_disabled_flag | u(1) |
| if( sps_act_enabled_flag && sps_explicit_scaling_list_enabled_flag ) | |
| sps_scaling_matrix_for_alternative_colour_space_disabled_flag | u(1) |
| if( sps_scaling_matrix_for_alternative_colour_space_disabled_flag ) | |
| sps_scaling_matrix_designated_colour_space_flag | u(1) |
| if( !no_tsrc_constraint_flag )  — 1301 | |
| sps_dep_quant_enabled_flag | u(1) |
| if( !sps_dep_quant_enabled_flag && !no_tsrc_constraint_flag)  — 1302 | |
| sps_sign_data_hiding_enabled_flag | u(1) |
| } | |

FIG. 13

Example slice header syntax

| slice_header( ) { 1401 | Descriptor |
|---|---|
|   if(!no_tsrc_constraint_flag && sps_dep_quant_enabled_flag) 1402 | |
|     sh_dep_quant_used_flag | u(1) |
|   if(!no_tsrc_constraint_flag && sps_sign_data_hiding_enabled_flag && !sh_dep_quant_used_flag ) | |
|     sh_sign_data_hiding_used_flag | u(1) |
|   if( sps_transform_skip_enabled_flag && !sh_dep_quant_used_flag && !sh_sign_data_hiding_used_flag ) | |
|     sh_ts_residual_coding_disabled_flag | u(1) |
| } | |

FIG. 14

Example general constraint syntax

| general_constraint_info( ) { | Descriptor |
|---|---|
| no_sign_data_hiding_constraint_flag | u(1) |
| ~~no_tsrc_constraint_flag~~ | ~~u(1)~~ |
| no_mixed_nalu_types_in_pic_constraint_flag | u(1) |
| } | |

FIG. 15

Example SPS syntax table

| seq_parameter_set_rbsp( ) { | Descriptor |
|---|---|
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   sps_gdr_enabled_flag | u(1) |
|   sps_chroma_format_idc | u(2) |
|   if( sps_chroma_format_idc == 3 ) | |
|     sps_separate_colour_plane_flag | u(1) |
|   sps_ref_pic_resampling_enabled_flag | u(1) |
|   if( sps_ref_pic_resampling_enabled_flag ) | |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) | |
|       sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|         sps_subpic_ctu_top_left_x[ i ] | u(v) |

FIG. 16A

| | |
|---|---|
| if( i > 0 && sps_pic_height_max_in_luma_samples > CtbSizeY ) { | |
|     sps_subpic_ctu_top_left_y[ i ] | u(v) |
|     if( i < sps_num_subpics_minus1 &&<br>       sps_pic_width_max_in_luma_samples > CtbSizeY ) | |
|     sps_subpic_width_minus1[ i ] | u(v) |
|     if( i < sps_num_subpics_minus1 &&<br>       sps_pic_height_max_in_luma_samples > CtbSizeY ) | |
|     sps_subpic_height_minus1[ i ] | u(v) |
|     if( !sps_independent_subpics_flag) { | |
|       sps_subpic_treated_as_pic_flag[ i ] | u(1) |
|       sps_loop_filter_across_subpic_enabled_flag[ i ] | u(1) |
|     } | |
| } | |
| sps_subpic_id_len_minus1 | ue(v) |
| sps_subpic_id_mapping_explicitly_signalled_flag | u(1) |
| if( sps_subpic_id_mapping_explicitly_signalled_flag ) { | |
|     sps_subpic_id_mapping_present_flag | u(1) |
|     if( sps_subpic_id_mapping_present_flag ) | |
|       for( i = 0; i <= sps_num_subpics_minus1; i++ ) | |
|         sps_subpic_id[ i ] | u(v) |
|     } | |
| } | |
| sps_bit_depth_minus8 | ue(v) |
| sps_entropy_coding_sync_enabled_flag | u(1) |
| sps_entry_point_offsets_present_flag | u(1) |
| sps_log2_max_pic_order_cnt_lsb_minus4 | u(4) |
| sps_poc_msb_cycle_flag | u(1) |
| if( sps_poc_msb_cycle_flag ) | |
|     sps_poc_msb_cycle_len_minus1 | ue(v) |
| sps_num_extra_ph_bits_bytes | u(2) |
| extra_ph_bits_struct( sps_num_extra_ph_bits_bytes ) | |
| sps_num_extra_sh_bits_bytes | u(2) |
| extra_sh_bits_struct( sps_num_extra_sh_bits_bytes ) | |

FIG. 16B

| | |
|---|---|
| if( sps_ptl_dpb_hrd_params_present_flag ) { | |
|   if( sps_max_sublayers_minus1 > 0 ) | |
|     sps_sublayer_dpb_params_flag | u(1) |
|   dpb_parameters( sps_max_sublayers_minus1, sps_sublayer_dpb_params_flag ) | |
| } | |
| if( ChromaArrayType != 0 ) | |
|   sps_qtbtt_dual_tree_intra_flag | u(1) |
| sps_log2_min_luma_coding_block_size_minus2 | ue(v) |
| sps_partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( sps_qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| if( CtbSizeY > 32 ) | |
|   sps_max_luma_transform_size_64_flag　～1601 | u(1) |

FIG. 16C

| | | |
|---|---|---|
| sps_transform_skip_enabled_flag | | u(1) |
| if( sps_transform_skip_enabled_flag ) { ⎯ 1602 | | |
|   sps_log2_transform_skip_max_size_minus2 | | ue(v) |
|   sps_bdpcm_enabled_flag | | u(1) |
| } | | |
| sps_mts_enabled_flag | | u(1) |
| if( sps_mts_enabled_flag ) { ⎯ 1603 | | |
|   sps_explicit_mts_intra_enabled_flag | | u(1) |
|   sps_explicit_mts_inter_enabled_flag | | u(1) |
| } | | |
| sps_lfnst_enabled_flag ⎯ 1604 | | u(1) |
| if( ChromaArrayType != 0 ) { | | |
|   sps_joint_cbcr_enabled_flag | | u(1) |
|   sps_same_qp_table_for_chroma_flag | | u(1) |
|   numQpTables = sps_same_qp_table_for_chroma_flag ? 1 : ( sps_joint_cbcr_enabled_flag ? 3 : 2 ) | | |
|   for( i = 0; i < numQpTables; i++ ) { | | |
|     sps_qp_table_start_minus26[ i ] | | se(v) |
|     sps_num_points_in_qp_table_minus1[ i ] | | ue(v) |
|     for( j = 0; j <= sps_num_points_in_qp_table_minus1[ i ]; j++ ) { | | |
|       sps_delta_qp_in_val_minus1[ i ][ j ] | | ue(v) |
|       sps_delta_qp_diff_val[ i ][ j ] | | ue(v) |
|     } | | |
|   } | | |
| } | | |
| sps_sao_enabled_flag | | u(1) |
| sps_alf_enabled_flag | | u(1) |
| if( sps_alf_enabled_flag && ChromaArrayType != 0 ) | | |
|   sps_ccalf_enabled_flag | | u(1) |
| sps_lmcs_enabled_flag ⎯ 1605 | | u(1) |
| ~~sps_transform_skip_enabled_flag~~ | | ~~u(1)~~ |
| ~~if( sps_transform_skip_enabled_flag ) {~~ | | |

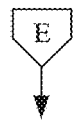

FIG. 16D

| | |
|---|---|
| ~~sps_log2_transform_skip_max_size_minus2~~ | ~~ue(v)~~ |
| ~~sps_bdpcm_enabled_flag~~ | ~~u(1)~~ |
| ~~}~~ | |
| sps_weighted_pred_flag | u(1) |
| sps_weighted_bipred_flag | u(1) |
| sps_long_term_ref_pics_flag | u(1) |
| if( sps_video_parameter_set_id > 0 ) | |
|    sps_inter_layer_ref_pics_present_flag | u(1) |
| sps_idr_rpl_present_flag | u(1) |
| sps_rpl1_same_as_rpl0_flag | u(1) |
| for( i = 0; i < sps_rpl1_same_as_rpl0_flag ? 1 : 2; i++ ) { | |
|    sps_num_ref_pic_lists[ i ] | ue(v) |
|    for( j = 0; j < sps_num_ref_pic_lists[ i ]; j++) | |
|      ref_pic_list_struct( i, j ) | |
| } | |
| sps_ref_wraparound_enabled_flag | u(1) |
| sps_temporal_mvp_enabled_flag | u(1) |
| if( sps_temporal_mvp_enabled_flag ) | |
|    sps_sbtmvp_enabled_flag | u(1) |
| sps_amvr_enabled_flag | u(1) |
| sps_bdof_enabled_flag | u(1) |
| if( sps_bdof_enabled_flag ) | |
|    sps_bdof_control_present_in_ph_flag | u(1) |
| sps_smvd_enabled_flag | u(1) |
| sps_dmvr_enabled_flag | u(1) |
| if( sps_dmvr_enabled_flag) | |
|    sps_dmvr_control_present_in_ph_flag | u(1) |
| sps_mmvd_enabled_flag | u(1) |
| if( sps_mmvd_enabled_flag ) | |
|    sps_mmvd_fullpel_only_flag | u(1) |
| sps_six_minus_max_num_merge_cand | ue(v) |
| sps_sbt_enabled_flag | u(1) |

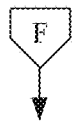

FIG. 16E

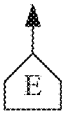

| | |
|---|---|
| sps_affine_enabled_flag | u(1) |
| if( sps_affine_enabled_flag ) { | |
|    sps_five_minus_max_num_subblock_merge_cand | ue(v) |
|    sps_affine_type_flag | u(1) |
|    if( sps_amvr_enabled_flag ) | |
|      sps_affine_amvr_enabled_flag | u(1) |
|    sps_affine_prof_enabled_flag | u(1) |
|    if( sps_affine_prof_enabled_flag ) | |
|      sps_prof_control_present_in_ph_flag | u(1) |
| } | |
| sps_bcw_enabled_flag | u(1) |
| sps_ciip_enabled_flag | u(1) |
| if( MaxNumMergeCand >= 2 ) { | |
|    sps_gpm_enabled_flag | u(1) |
|    if( sps_gpm_enabled_flag && MaxNumMergeCand >= 3 ) | |
|      sps_max_num_merge_cand_minus_max_num_gpm_cand | ue(v) |
| } | |
| sps_log2_parallel_merge_level_minus2 | ue(v) |
| sps_isp_enabled_flag | u(1) |
| sps_mrl_enabled_flag | u(1) |
| sps_mip_enabled_flag | u(1) |
| if( ChromaArrayType != 0 ) | |
|    sps_cclm_enabled_flag | u(1) |
| if( sps_chroma_format_idc == 1 ) { | |
|    sps_chroma_horizontal_collocated_flag | u(1) |
|    sps_chroma_vertical_collocated_flag | u(1) |
| } | |
| ~~sps_mts_enabled_flag~~ | ~~u(1)~~ |
| ~~if( sps_mts_enabled_flag ) {~~ | |
|    ~~sps_explicit_mts_intra_enabled_flag~~ | ~~u(1)~~ |
|    ~~sps_explicit_mts_inter_enabled_flag~~ | ~~u(1)~~ |
| ~~}~~ | |

FIG. 16F

| | |
|---|---|
| sps_palette_enabled_flag | u(1) |
| if( ChromaArrayType == 3 && !sps_max_luma_transform_size_64_flag ) | |
|   sps_act_enabled_flag | u(1) |
| if( sps_transform_skip_enabled_flag \|\| sps_palette_enabled_flag ) | |
|   sps_internal_bit_depth_minus_input_bit_depth | ue(v) |
| sps_ibc_enabled_flag | u(1) |
| if( sps_ibc_enabled_flag ) | |
|   sps_six_minus_max_num_ibc_merge_cand | ue(v) |
| ~~sps_lmcs_enabled_flag~~ | ~~u(1)~~ |
| ~~sps_lfnst_enabled_flag~~ | ~~u(1)~~ |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_explicit_scaling_list_enabled_flag | u(1) |
| if( sps_lfnst_enabled_flag && sps_explicit_scaling_list_enabled_flag ) | |
|   sps_scaling_matrix_for_lfnst_disabled_flag | u(1) |
| if( sps_act_enabled_flag && sps_explicit_scaling_list_enabled_flag ) | |
|   sps_scaling_matrix_for_alternative_colour_space_disabled_flag | u(1) |
| if( sps_scaling_matrix_for_alternative_colour_space_disabled_flag ) | |
|   sps_scaling_matrix_designated_colour_space_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |

FIG. 16G

| | |
|---|---|
| sps_virtual_boundaries_present_flag | u(1) |
| if( sps_virtual_boundaries_present_flag ) { | |
|   sps_num_ver_virtual_boundaries | u(2) |
|   for( i = 0; i < sps_num_ver_virtual_boundaries; i++ ) | |
|     sps_virtual_boundary_pos_x[ i ] | ue(v) |
|   sps_num_hor_virtual_boundaries | u(2) |
|   for( i = 0; i < sps_num_hor_virtual_boundaries; i++ ) | |
|     sps_virtual_boundary_pos_y[ i ] | ue(v) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 :<br>        sps_max_sublayers_minus1 | |
|     ols_hrd_parameters( firstSubLayer, sps_max_sublayers_minus1 ) | |
|     } | |
|   } | |
| sps_field_seq_flag | u(1) |
| sps_vui_parameters_present_flag | u(1) |
| if( sps_vui_parameters_present_flag ) | |
|   vui_parameters( ) /* Specified in ITU-T H.SEI | ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

FIG. 16H

Example PH syntax table

| picture_header_structure( ) { | Descriptor |
|---|---|
|   ph_gdr_or_irap_pic_flag | u(1) |
|   if( ph_gdr_or_irap_pic_flag ) | |
|     ph_gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ph_non_ref_pic_flag | u(1) |
|   ph_pic_parameter_set_id | ue(v) |
|   ph_pic_order_cnt_lsb | u(v) |
|   if( ph_gdr_or_irap_pic_flag ) | |
|     ph_no_output_of_prior_pics_flag | u(1) |
|   if( ph_gdr_pic_flag ) | |
|     ph_recovery_poc_cnt | ue(v) |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if( sps_alf_enabled_flag && pps_alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) { | |
|         ph_alf_cb_flag | u(1) |
|         ph_alf_cr_flag | u(1) |
|       } | |
|       if( ph_alf_cb_flag \|\| ph_alf_cr_flag ) | |
|         ph_alf_aps_id_chroma | u(3) |
|       if( sps_ccalf_enabled_flag ) { | |
|         ph_cc_alf_cb_enabled_flag | u(1) |

FIG. 17A

| | |
|---|---|
| if( ph_cc_alf_cb_enabled_flag ) | |
|     ph_cc_alf_cb_aps_id | u(3) |
|   ph_cc_alf_cr_enabled_flag | u(1) |
|   if( ph_cc_alf_cr_enabled_flag ) | |
|     ph_cc_alf_cr_aps_id | u(3) |
|   } | |
| } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_sao_enabled_flag && pps_sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( pps_deblocking_filter_override_enabled_flag && pps_dbf_info_in_ph_fla ) { | 17011 |
|   ph_deblocking_filter_override_flag | u(1) |
|   if( ph_deblocking_filter_override_flag ) { | |
|     if( !pps_deblocking_filter_disabled_flag ) | |
|       ph_deblocking_filter_disabled_flag | u(1) |
|     if( !ph_deblocking_filter_disabled_flag ) { | |
|       ph_luma_beta_offset_div2 | se(v) |
|       ph_luma_tc_offset_div2 | se(v) |
|       if( pps_chroma_tool_offsets_present_flag ) { | |
|         ph_cb_beta_offset_div2 | se(v) |

| | |
|---|---|
| ph_cb_tc_offset_div2 | se(v) |
| ph_cr_beta_offset_div2 | se(v) |
| ph_cr_tc_offset_div2 | se(v) |
| } | |
| } | |
| } | |
| } | |
| if( sps_explicit_scaling_list_enabled_flag ) { | |
|   ph_explicit_scaling_list_enabled_flag | u(1) |
|   if( ph_explicit_scaling_list_enabled_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundary_pos_x[ i ] | ue(v) |
|     ph_num_hor_virtual_boundaries | u(2) |
|     for( i = 0; i < ph_num_hor_virtual_boundaries; i++ ) | |
|       ph_virtual_boundary_pos_y[ i ] | ue(v) |
|   } | |
| } | |
| if( pps_output_flag_present_flag && !ph_non_ref_pic_flag ) | |
|   ph_pic_output_flag | u(1) |
| if( pps_rpl_info_in_ph_flag ) | |
|   ref_pic_lists( ) | |
| if( sps_partition_constraints_override_enabled_flag ) | |
|   ph_partition_constraints_override_flag | u(1) |
| if( ph_intra_slice_allowed_flag ) { | |
|   if( ph_partition_constraints_override_flag ) { | |

17012

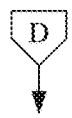

FIG. 17C

| | |
|---|---|
| ph_log2_diff_min_qt_min_cb_intra_slice_luma | ue(v) |
| ph_max_mtt_hierarchy_depth_intra_slice_luma | ue(v) |
| if( ph_max_mtt_hierarchy_depth_intra_slice_luma != 0 ) { | |
|   ph_log2_diff_max_bt_min_qt_intra_slice_luma | ue(v) |
|   ph_log2_diff_max_tt_min_qt_intra_slice_luma | ue(v) |
| } | |
| if( sps_qtbtt_dual_tree_intra_flag ) { | |
|   ph_log2_diff_min_qt_min_cb_intra_slice_chroma | ue(v) |
|   ph_max_mtt_hierarchy_depth_intra_slice_chroma | ue(v) |
|   if( ph_max_mtt_hierarchy_depth_intra_slice_chroma != 0 ) { | |
|     ph_log2_diff_max_bt_min_qt_intra_slice_chroma | ue(v) |
|     ph_log2_diff_max_tt_min_qt_intra_slice_chroma | ue(v) |
|     } | |
|   } | |
| } | |
| if( pps_cu_qp_delta_enabled_flag ) | |
|   ph_cu_qp_delta_subdiv_intra_slice | ue(v) |
| if( pps_cu_chroma_qp_offset_list_enabled_flag ) | |
|   ph_cu_chroma_qp_offset_subdiv_intra_slice | ue(v) |
| } | |
| if( ph_inter_slice_allowed_flag ) { | |
|   if( ph_partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( pps_cu_qp_delta_enabled_flag ) | |
|     ph_cu_qp_delta_subdiv_inter_slice | ue(v) |
|   if( pps_cu_chroma_qp_offset_list_enabled_flag ) | |

FIG. 17D

| | |
|---|---|
| ph_cu_chroma_qp_offset_subdiv_inter_slice | ue(v) |
| if( sps_temporal_mvp_enabled_flag ) { | |
|   ph_temporal_mvp_enabled_flag | u(1) |
|   if( ph_temporal_mvp_enabled_flag && pps_rpl_info_in_ph_flag ) { | |
|     if( num_ref_entries[ 1 ][ RplsIdx[ 1 ] ] > 0 ) | |
|       ph_collocated_from_l0_flag | u(1) |
|     if( ( ph_collocated_from_l0_flag && <br>       num_ref_entries[ 0 ][ RplsIdx[ 0 ] ] > 1 ) \|\| <br>       ( !ph_collocated_from_l0_flag && <br>       num_ref_entries[ 1 ][ RplsIdx[ 1 ] ] > 1 ) ) | |
|       ph_collocated_ref_idx | ue(v) |
|   } | |
| } | |
| if( sps_mmvd_fullpel_only_flag ) | |
|   ph_mmvd_fullpel_only_flag | u(1) |
| if( !pps_rpl_info_in_ph_flag \|\| num_ref_entries[ 1 ][ RplsIdx[ 1 ] ] > 0 ) { | |
|   ph_mvd_l1_zero_flag | u(1) |
|   if( sps_bdof_control_present_in_ph_flag ) | |
|     ph_bdof_disabled_flag | u(1) |
|   if( sps_dmvr_control_present_in_ph_flag ) | |
|     ph_dmvr_disabled_flag | u(1) |
| } | |
| if( sps_prof_control_present_in_ph_flag ) | |
|   ph_prof_disabled_flag | u(1) |
| if( ( pps_weighted_pred_flag \|\| pps_weighted_bipred_flag ) && <br>   pps_wp_info_in_ph_flag ) | |
|   pred_weight_table( ) | |
| } | |
| if( pps_qp_delta_info_in_ph_flag ) | |
|   ph_qp_delta | se(v) |
| if( sps_joint_cbcr_enabled_flag ) | |
|   ph_joint_cbcr_sign_flag | u(1) |

FIG. 17E

| | |
|---|---|
| ~~if( sps_sao_enabled_flag && pps_sao_info_in_ph_flag ) {~~ | |
| ~~ph_sao_luma_enabled_flag~~ | ~~u(1)~~ |
| ~~if( ChromaArrayType != 0 )~~ | |
| ~~ph_sao_chroma_enabled_flag~~ | ~~u(1)~~ |
| ~~}~~ | |
| ~~if( pps_deblocking_filter_override_enabled_flag && pps_dbf_info_in_ph_fla~~ ~~){~~ | |
| ~~ph_deblocking_filter_override_flag~~ | ~~u(1)~~ |
| ~~if( ph_deblocking_filter_override_flag ) {~~ | |
| ~~if( !pps_deblocking_filter_disabled_flag )~~ | |
| ~~ph_deblocking_filter_disabled_flag~~ | ~~u(1)~~ |
| ~~if( !ph_deblocking_filter_disabled_flag ) {~~ | |
| ~~ph_luma_beta_offset_div2~~ | ~~se(v)~~ |
| ~~ph_luma_tc_offset_div2~~ | ~~se(v)~~ |
| ~~if( pps_chroma_tool_offsets_present_flag ) {~~ | |
| ~~ph_cb_beta_offset_div2~~ | ~~se(v)~~ |
| ~~ph_cb_tc_offset_div2~~ | ~~se(v)~~ |
| ~~ph_cr_beta_offset_div2~~ | ~~se(v)~~ |
| ~~ph_cr_tc_offset_div2~~ | ~~se(v)~~ |
| ~~}~~ | |
| ~~}~~ | |
| ~~}~~ | |
| ~~}~~ | |
| if( pps_picture_header_extension_present_flag ) { | |
|   ph_extension_length | ue(v) |
|   for( i = 0; i < ph_extension_length; i++) | |
|     ph_extension_data_byte[ i ] | u(8) |
|   } | |
| } | |

FIG. 17F

Example SH syntax table

| slice_header( ) { | Descriptor |
|---|---|
|   sh_picture_header_in_slice_header_flag | u(1) |
|   if( sh_picture_header_in_slice_header_flag ) | |
|     picture_header_structure( ) | |
|   if( sps_subpic_info_present_flag ) | |
|     sh_subpic_id | u(v) |
|   if( ( pps_rect_slice_flag && NumSlicesInSubpic[ CurrSubpicIdx ] > 1 ) \|\| <br>    ( !pps_rect_slice_flag && NumTilesInPic > 1 ) ) | |
|     sh_slice_address | u(v) |
|   for( i = 0; i < NumExtraShBits; i++ ) | |
|     sh_extra_bit[ i ] | u(1) |
|   if( !pps_rect_slice_flag && NumTilesInPic − sh_slice_address > 1 ) | |
|     sh_num_tiles_in_slice_minus1 | ue(v) |
|   if( ph_inter_slice_allowed_flag ) | |
|     sh_slice_type | ue(v) |
|   if( sps_alf_enabled_flag && !pps_alf_info_in_ph_flag ) { | |
|     sh_alf_enabled_flag | u(1) |
|     if( sh_alf_enabled_flag ) { | |
|       sh_num_alf_aps_ids_luma | u(3) |
|       for( i = 0; i < sh_num_alf_aps_ids_luma; i++ ) | |
|         sh_alf_aps_id_luma[ i ] | u(3) |
|       if( ChromaArrayType != 0 ) { | |
|         sh_alf_cb_flag | u(1) |
|         sh_alf_cr_flag | u(1) |
|       } | |
|       if( sh_alf_cb_flag \|\| sh_alf_cr_flag ) | |
|         sh_alf_aps_id_chroma | u(3) |
|       if( sps_ccalf_enabled_flag ) { | |
|         sh_cc_alf_cb_enabled_flag | u(1) |
|         if( sh_cc_alf_cb_enabled_flag ) | |
|           sh_cc_alf_cb_aps_id | u(3) |
|         sh_cc_alf_cr_enabled_flag | u(1) |
|         if( sh_cc_alf_cr_enabled_flag ) | |
|           sh_cc_alf_cr_aps_id | u(3) |

FIG. 18A

| | |
|---|---|
|        } | |
|      } | |
|   } | |
|   if( ph_lmcs_enabled_flag && !sh_picture_header_in_slice_header_flag ) | |
|     sh_lmcs_used_flag | u(1) |
|   if( sps_sao_enabled_flag && !pps_sao_info_in_ph_flag ) { | |
|     sh_sao_luma_used_flag | u(1) |
|     if( ChromaArrayType != 0 ) | |
|       sh_sao_chroma_used_flag | u(1) |
|   } | |
|   if( pps_deblocking_filter_override_enabled_flag && !pps_dbf_info_in_ph_flag ) | |
|     sh_deblocking_filter_override_flag | u(1) |
|   if( sh_deblocking_filter_override_flag ) { | |
|     if( !pps_deblocking_filter_disabled_flag )    1801 | |
|       sh_deblocking_filter_disabled_flag | u(1) |
|     if( !sh_deblocking_filter_disabled_flag ) { | |
|       sh_luma_beta_offset_div2 | se(v) |
|       sh_luma_tc_offset_div2 | se(v) |
|       if( pps_chroma_tool_offsets_present_flag ) { | |
|         sh_cb_beta_offset_div2 | se(v) |
|         sh_cb_tc_offset_div2 | se(v) |
|         sh_cr_beta_offset_div2 | se(v) |
|         sh_cr_tc_offset_div2 | se(v) |
|       } | |
|     } | |
|   } | |
|   if( ph_explicit_scaling_list_enabled_flag && !sh_picture_header_in_slice_header_flag ) | |
|     sh_explicit_scaling_list_used_flag | u(1) |
|   if( sps_separate_colour_plane_flag == 1 ) | |
|     sh_colour_plane_id | u(2) |

FIG. 18B

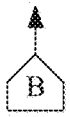

| | |
|---|---|
| if( !pps_rpl_info_in_ph_flag && ( ( nal_unit_type != IDR_W_RADL &&<br>    nal_unit_type != IDR_N_LP ) \|\| sps_idr_rpl_present_flag ) ) | |
|   ref_pic_lists( ) | |
| if( ( ( ( sh_slice_type != I && num_ref_entries[ 0 ][ RplsIdx[ 0 ] ] > 1 ) \|\|<br>    ( sh_slice_type == B && num_ref_entries[ 1 ][ RplsIdx[ 1 ] ] > 1 ) ) )<br>{ | |
|   sh_num_ref_idx_active_override_flag | u(1) |
|   if( sh_num_ref_idx_active_override_flag ) | |
|     for( i = 0; i < ( sh_slice_type == B ? 2: 1 ); i++ ) | |
|       if( num_ref_entries[ i ][ RplsIdx[ i ] ] > 1 ) | |
|         sh_num_ref_idx_active_minus1[ i ] | ue(v) |
|   } | |
| if( sh_slice_type != I ) { | |
|   if( pps_cabac_init_present_flag ) | |
|     sh_cabac_init_flag | u(1) |
|   if( ph_temporal_mvp_enabled_flag && !pps_rpl_info_in_ph_flag ) { | |
|     if( sh_slice_type == B ) | |
|       sh_collocated_from_l0_flag | u(1) |
|     if( ( sh_collocated_from_l0_flag && NumRefIdxActive[ 0 ] > 1 ) \|\|<br>      ( ! sh_collocated_from_l0_flag && NumRefIdxActive[ 1 ] > 1 ) ) | |
|       sh_collocated_ref_idx | ue(v) |
|   } | |
|   if( !pps_wp_info_in_ph_flag &&<br>    ( ( pps_weighted_pred_flag && sh_slice_type == P ) \|\|<br>    ( pps_weighted_bipred_flag && sh_slice_type == B ) ) ) | |
|     pred_weight_table( ) | |
| } | |
| if( !pps_qp_delta_info_in_ph_flag ) | |
|   sh_qp_delta | se(v) |
| if( pps_slice_chroma_qp_offsets_present_flag ) { | |
|   sh_cb_qp_offset | se(v) |
|   sh_cr_qp_offset | se(v) |
|   if( sps_joint_cbcr_enabled_flag ) | |

FIG. 18C

| | |
|---|---|
|     sh_joint_cbcr_qp_offset | se(v) |
|   } | |
| if( pps_cu_chroma_qp_offset_list_enabled_flag ) | |
|   sh_cu_chroma_qp_offset_enabled_flag | u(1) |
| ~~if( sps_sao_enabled_flag && !pps_sao_info_in_ph_flag ) {~~ | |
| ~~  sh_sao_luma_used_flag~~ | ~~u(1)~~ |
| ~~  if( ChromaArrayType != 0 )~~ | |
| ~~    sh_sao_chroma_used_flag~~ | ~~u(1)~~ |
| ~~}~~ | |
| ~~if( pps_deblocking_filter_override_enabled_flag && !pps_dbf_info_in_ph_flag )~~ | |
| ~~  sh_deblocking_filter_override_flag~~ | ~~u(1)~~ |
| ~~if( sh_deblocking_filter_override_flag ) {~~ | |
| ~~  if( !pps_deblocking_filter_disabled_flag )~~ | |
| ~~    sh_deblocking_filter_disabled_flag~~ | ~~u(1)~~ |
| ~~  if( !sh_deblocking_filter_disabled_flag ) {~~ | |
| ~~    sh_luma_beta_offset_div2~~ | ~~se(v)~~ |
| ~~    sh_luma_tc_offset_div2~~ | ~~se(v)~~ |
| ~~    if( pps_chroma_tool_offsets_present_flag ) {~~ | |
| ~~      sh_cb_beta_offset_div2~~ | ~~se(v)~~ |
| ~~      sh_cb_tc_offset_div2~~ | ~~se(v)~~ |
| ~~      sh_cr_beta_offset_div2~~ | ~~se(v)~~ |
| ~~      sh_cr_tc_offset_div2~~ | ~~se(v)~~ |
| ~~    }~~ | |
| ~~  }~~ | |
| ~~}~~ | |
| if( sps_dep_quant_enabled_flag ) | |
|   sh_dep_quant_used_flag | u(1) |
| if( sps_sign_data_hiding_enabled_flag && !sh_dep_quant_used_flag ) | |
|   sh_sign_data_hiding_used_flag | u(1) |
| if( sps_transform_skip_enabled_flag && !sh_dep_quant_used_flag && !sh_sign_data_hiding_used_flag ) | |

FIG. 18D

| | |
|---|---|
| sh_ts_residual_coding_disabled_flag | u(1) |
| if( pps_slice_header_extension_present_flag ) { | |
|   sh_slice_header_extension_length | ue(v) |
|   for( i = 0; i < sh_slice_header_extension_length; i++) | |
|     sh_slice_header_extension_data_byte[ i ] | u(8) |
| } | |
| if( NumEntryPoints > 0 ) { | |
|   sh_entry_offset_len_minus1 | ue(v) |
|   for( i = 0; i < NumEntryPoints; i++ ) | |
|     sh_entry_point_offset_minus1[ i ] | u(v) |
| } | |
| byte_alignment( ) | |
| } | |

# METHOD AND APPARATUS FOR PROCESSING VIDEO CONTENT WITH ALF AND CCALF

CROSS-REFERENCE TO RELATED APPLICATIONS

The present disclosure claims priority to U.S. provisional application No. 63/028,615 filed on May 22, 2020, which is incorporated herein by reference in its entirety.

TECHNICAL FIELD

The present disclosure generally relates to video processing, and more particularly, to methods and apparatuses for processing video content with high level syntax clean-up of VVC.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY

Embodiments of the present disclosure provide a method and apparatus for processing video content. The method can include: receiving a bitstream comprising video content; determining whether a first signal associated with the video content satisfies a given condition; and in response to the determination that the first signal satisfies the given condition, disabling both a cross component adaptive loop filter (CCALF) process and a chroma adaptive loop filter (ALF) process.

The apparatus can include a memory storing a set of instructions; and one or more processors configured to execute the set of instructions to cause the apparatus to perform: receiving a bitstream comprising video content; determining whether a first signal associated with the video content satisfies a given condition; and in response to the determination that the first signal satisfies the given condition, disabling both a cross component adaptive loop filter (CCALF) process and a chroma adaptive loop filter (ALF) process.

The embodiments of the present disclosure further provide a non-transitory computer readable medium that stores a set of instructions that is executable by at least one processor of a computer to cause the computer to perform a method for processing video content, the method comprising: receiving a bitstream comprising video content; determining whether a first signal associated with the video content satisfies a given condition; and in response to the determination that the first signal satisfies the given condition, disabling both a cross component adaptive loop filter (CCALF) process and a chroma adaptive loop filter (ALF) process.

Embodiments of the present disclosure also provide a method and apparatus for processing video content. The method can include: receiving a bitstream comprising video content; determining whether a first signal associated with the video content satisfies a given condition; and in response to the determination that the first signal satisfies the given condition, disabling, for at least one slice, dependent quantization (DQ) and sign data hiding (SDH).

The apparatus can include a memory storing a set of instructions; and one or more processors configured to execute the set of instructions to cause the apparatus to perform: receiving a bitstream comprising video content; determining whether a first signal associated with the video content satisfies a given condition; and in response to the determination that the first signal satisfies the given condition, disabling, for at least one slice, dependent quantization (DQ) and sign data hiding (SDH).

The embodiments of the present disclosure further provide a non-transitory computer readable medium that stores a set of instructions that is executable by at least one processor of a computer to cause the computer to perform a method for processing video content, the method comprising: receiving a bitstream comprising video content; determining whether a first signal associated with the video content satisfies a given condition; and in response to the determination that the first signal satisfies the given condition, disabling, for at least one slice, dependent quantization (DQ) and sign data hiding (SDH).

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates exemplary sequence parameter set syntax structures, consistent with some embodiments of the present disclosure.

FIG. 7 illustrates exemplary picture header syntax structures, consistent with some embodiments of the present disclosure.

FIG. 8 illustrates exemplary slice header syntax structures, consistent with some embodiments of the present disclosure.

FIG. 9 illustrates exemplary picture parameter set syntax structures, consistent with some embodiments of the present disclosure.

FIG. 10 illustrates exemplary picture header syntax structures, consistent with some embodiments of the present disclosure.

FIG. 11 illustrates exemplary slice header syntax structures, consistent with some embodiments of the present disclosure.

FIG. 13 illustrates exemplary sequence parameter set syntax structures, consistent with some embodiments of the present disclosure.

FIG. 14 illustrates exemplary slice header syntax structures, consistent with some embodiments of the present disclosure.

FIG. 15 illustrates exemplary general constraint syntax structures, consistent with some embodiments of the present disclosure.

FIG. 16A-H illustrates exemplary sequence parameter set syntax structures, consistent with some embodiments of the present disclosure.

FIG. 17A-F illustrates exemplary picture header syntax structures, consistent with some embodiments of the present disclosure.

FIG. 18A-E illustrates exemplary slice header syntax structures, consistent with some embodiments of the present disclosure.

DETAILED DESCRIPTION

Figure 1:
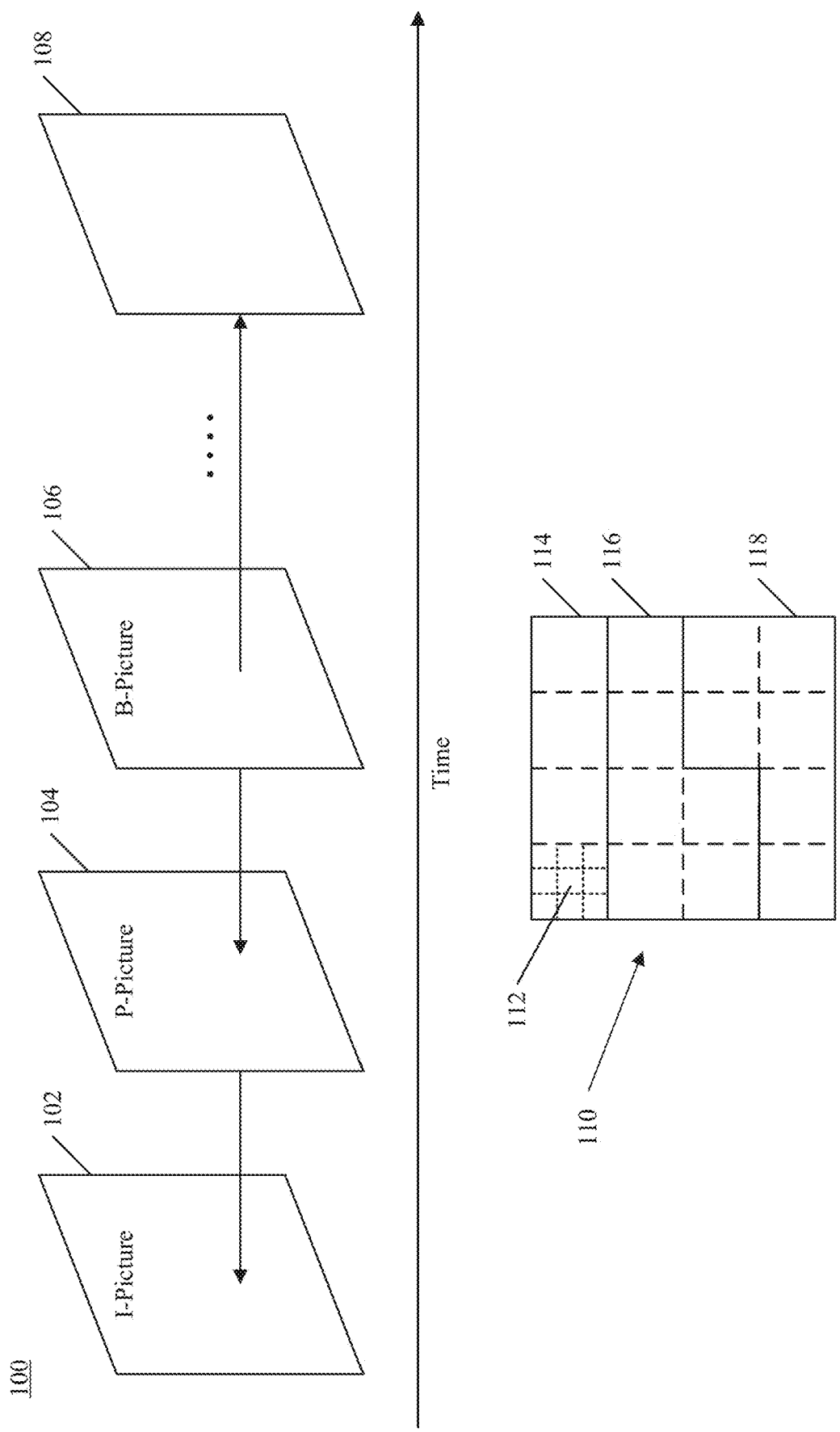
FIG. 1 illustrates a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

The present disclosure is directed to methods and apparatuses for processing video content consistent with above-described video coding standards.

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
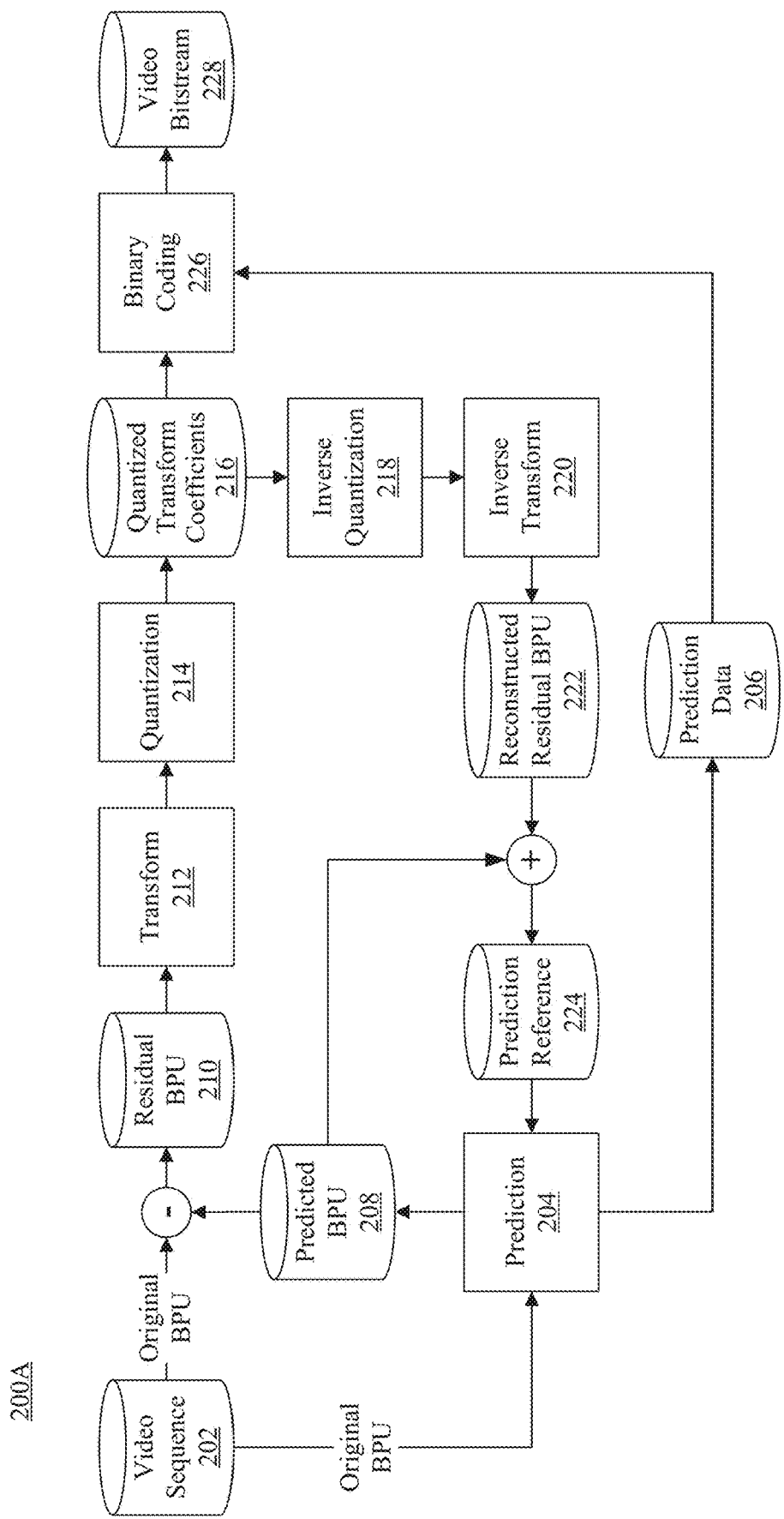
FIG. 2A illustrates a schematic diagram illustrating an exemplary encoding process of a hybrid video coding system, consistent with some embodiments of the present disclosure.
Figure 2B:
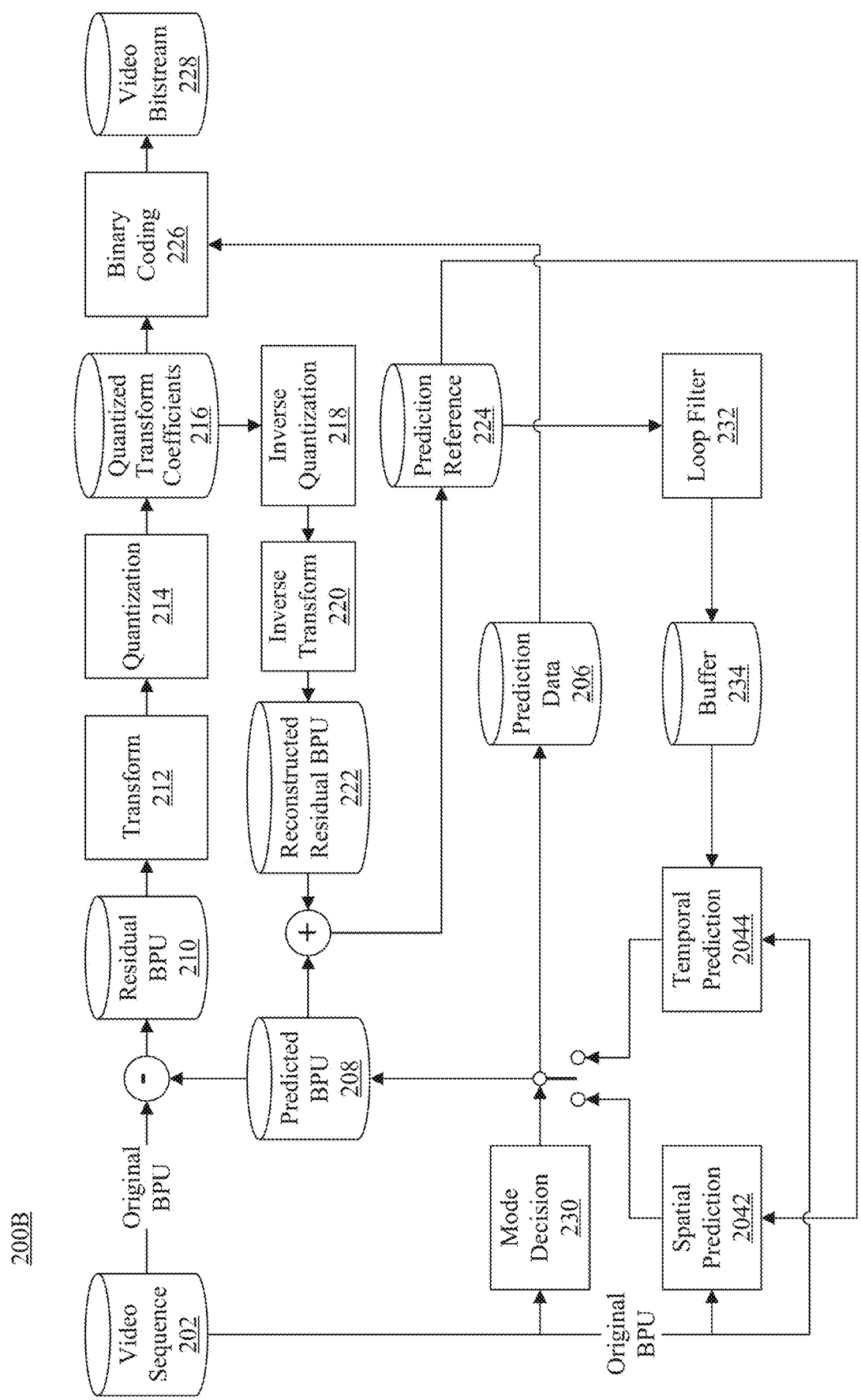
FIG. 2B illustrates a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder may record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
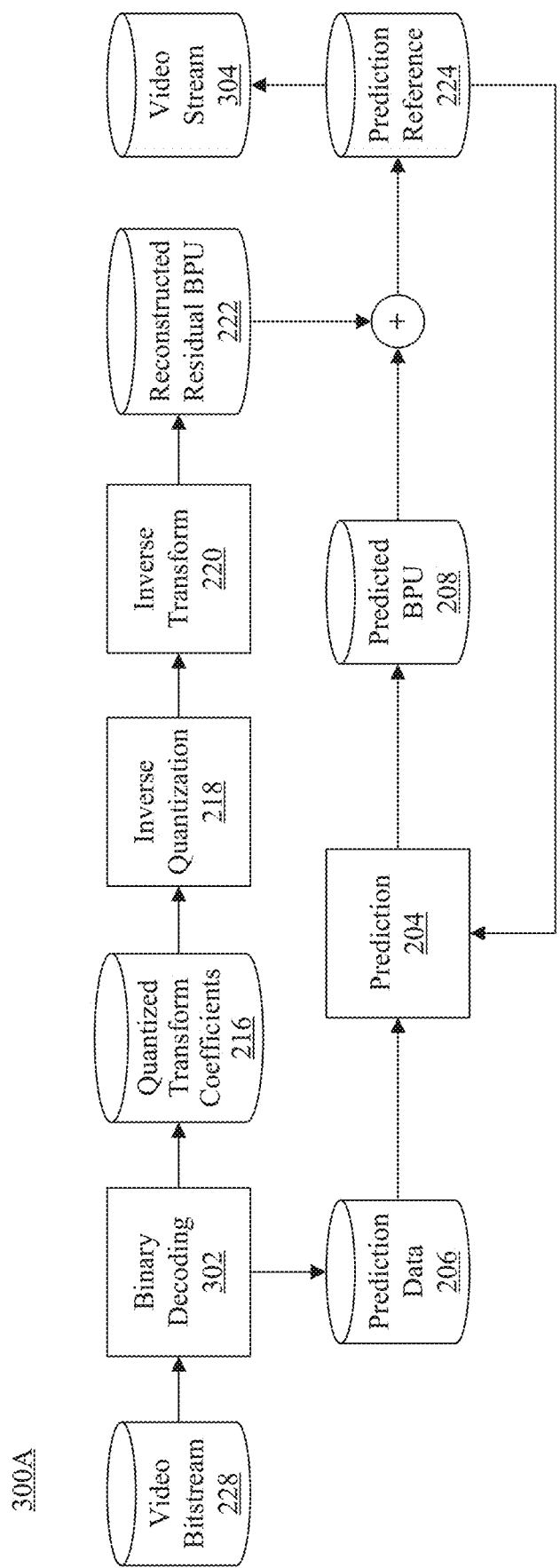
FIG. 3A illustrates a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
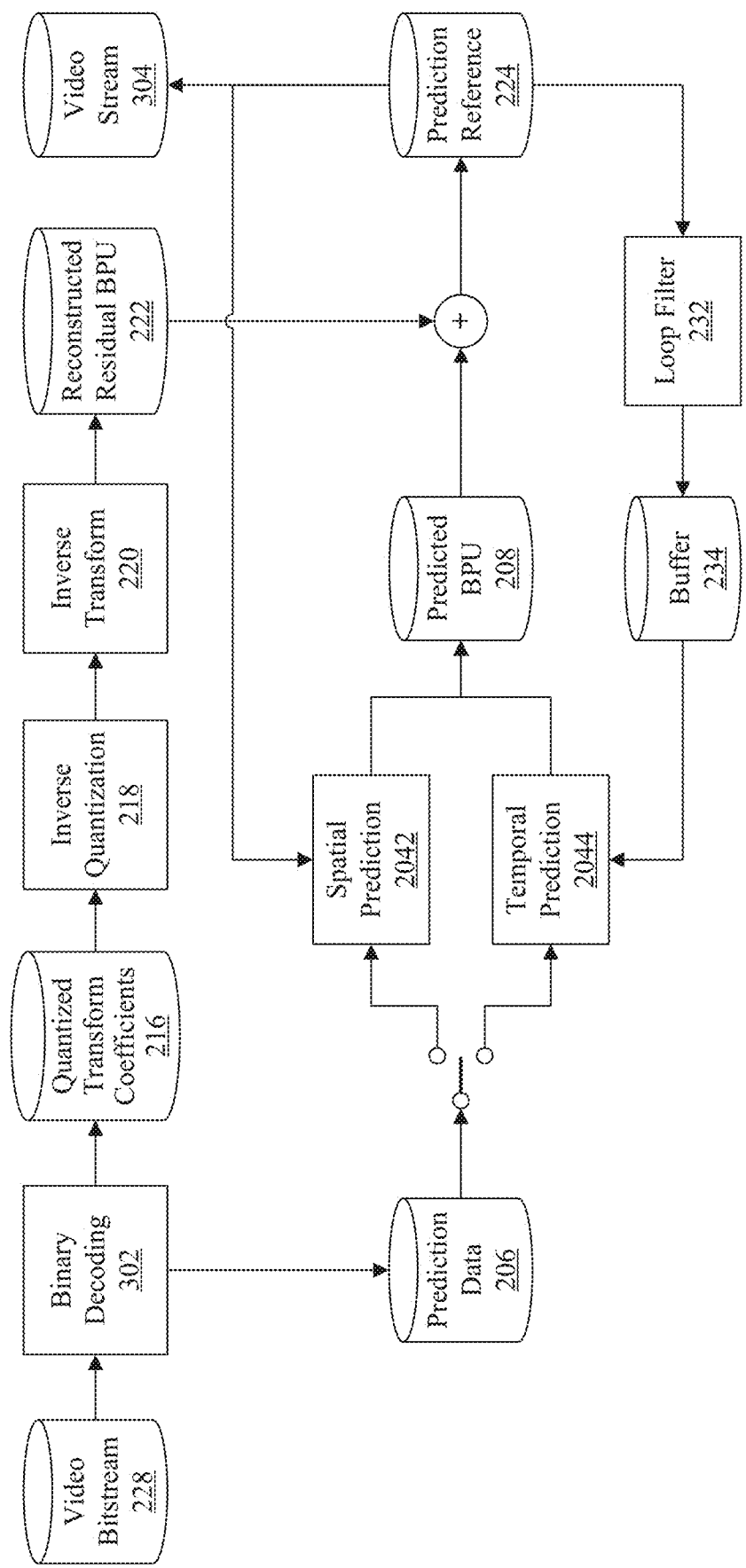
FIG. 3B illustrates a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
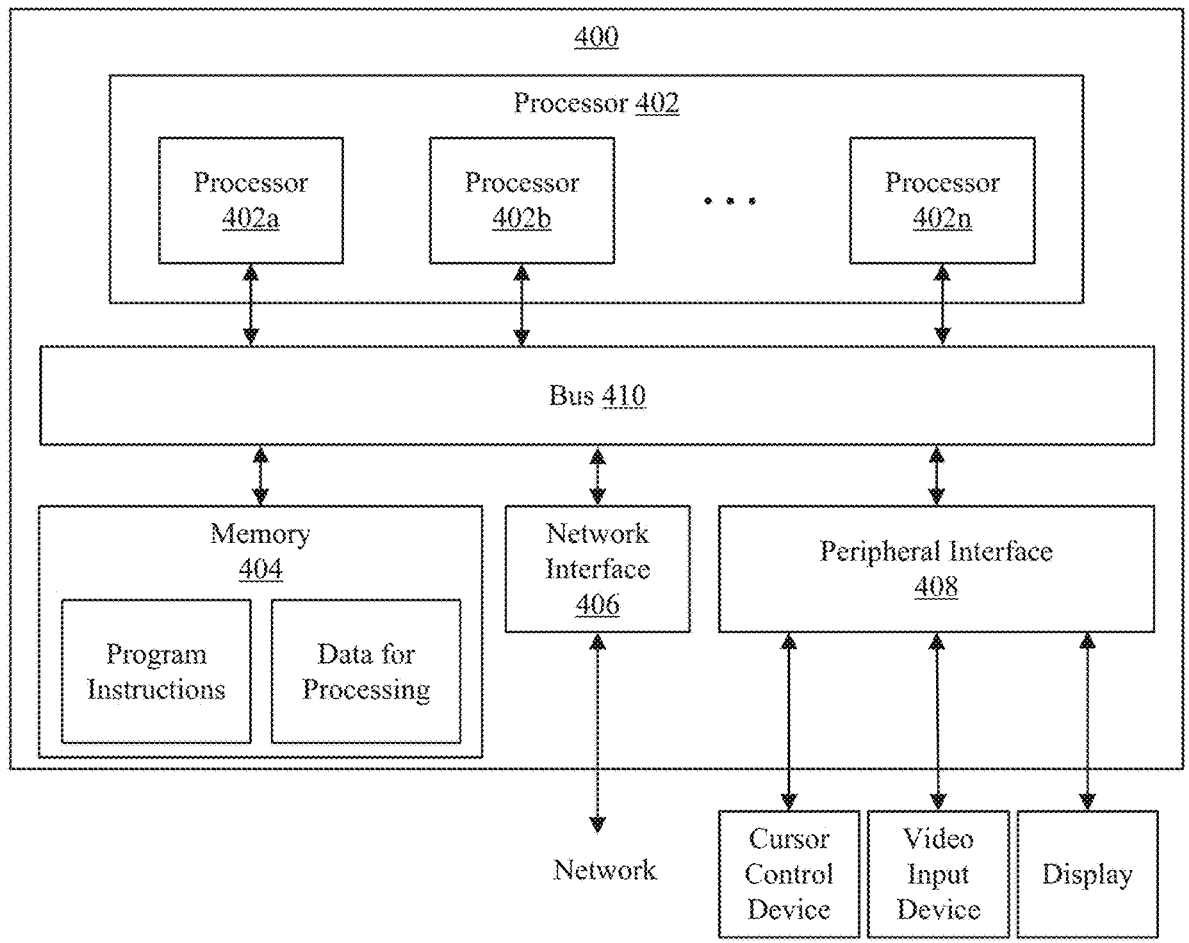
FIG. 4 illustrates a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In VVC, an Adaptive Loop Filter (ALF) with block-based filter adaption is applied. For the luma component, one among 25 filters is selected for each 4×4 block, based on the direction and activity of local gradients. In addition to ALF, in VVC draft 9, the Cross Component Adaptive Loop Filter (CCALF) is also used. The CCALF filter is designed to operate in parallel with the luma ALF.

VVC supports three types of adaptation parameter set (APS) network-abstraction-layer (NAL) units, such as ALF_APS, LMCS_APS and SCALING APS. The filter coefficients of ALF and CCALF process are signaled in the ALF_APS. In one ALF_APS, up to 25 sets of luma ALF filter coefficients and clipping value indexes, and up to eight sets of chroma ALF filter coefficients and clipping value indexes can be signaled. In addition, up to 4 sets of CCALF filter coefficients for Cb component and up to 4 sets of CCALF filter coefficients for Cr component are signaled.

In VVC draft 9, there are two residual coding methods, including (a) regular residual coding (RRC) method and (b) transform-skip residual coding (TSRC) method. In the specification, these residual coding methods are specified as "residual_coding" and "residual_ts_coding." In VVC draft 9, both the transform-skip (TS) and block differential pulse code modulation (BDPCM) blocks are allowed to select either RRC or TSRC method under certain conditions. If the value of the slice level flag slice_ts_residual_coding_disabled_flag for a slice is equal to 0, blocks coded in TS and BDPCM modes of that slice select TSRC. If the value of the slice level flag slice_ts_residual_coding_disabled_flag for a slice is equal to 1, the TS and BDPCM coded blocks of that slice select RRC.

The current design of VVC has drawbacks directed to no_aps_constraint_flag syntax element, to no_tsrc_constraint_flag syntax element, and to syntax order. The present disclosure provides proposed methods such as updating definitions of syntax elements and updating syntax tables to address the drawbacks.

The first drawback is directed to the no_aps_constraint_flag syntax element. The current design of VVC has several constraint flags signaled in SPS. Those constraint flags (e.g., no_aps_constraint_flag syntax element) can be used to define profiles where certain coding tools are deactivated. The no_aps_constraint_flag syntax element specifies whether the APS NAL unit is present in the bit-stream. Following is the semantic of the no_aps_constraint_flag.

The no_aps_constraint_flag syntax element being equal to 1 specifies that there can be no NAL unit with nuh_unit_type equal to PREFIX_APS_NUT or SUFFIX_APS_NUT present in OlsInScope, and the sps_lmcs_enabled_flag and sps_scaling_list_enabled_flag can both be equal to 0. The no_aps_constraint_flag syntax element being equal to 0 does not impose such a constraint.

As it is mentioned above, VVC supports three types of APS NAL units, such as ALF_APS, LMCS_APS, and SCALING APS. From the above semantic definition of no_aps_constraint_flag, it is shown that if the no_aps_constraint_flag syntax element is equal to 1, the coding tools LMCS and scaling list are disabled by setting sps_lmcs_enabled_flag and sps_scaling_list_enabled_flag equal to 0. However, in current VVC design, ALF and CCALF can still be enabled even if there is no APS being signaled (i.e., no_aps_constraint_flag is equal to 1).

In current VVC design, the ALF process of luma components can be enabled without sending the APS, because VVC allows fixed/default set of filter sets for luma ALF. However, there is no such fixed/default sets of filters for chroma ALF and CCALF process. Therefore, it is asserted that the chroma ALF and CCALF process cannot be executed without signaling of filter sets through APS.

In the proposed methods, both the chroma ALF process and the CCALF process are disabled when no APS is signaled (i.e., no_aps_constraint_flag is equal to 1). The methods for disabling the chroma ALF process and the CCALF process include updating the definition of the no_aps_constraint_flag syntax element and introducing new flags. The methods address the above drawback and provides better code efficiency.

Figure 5:
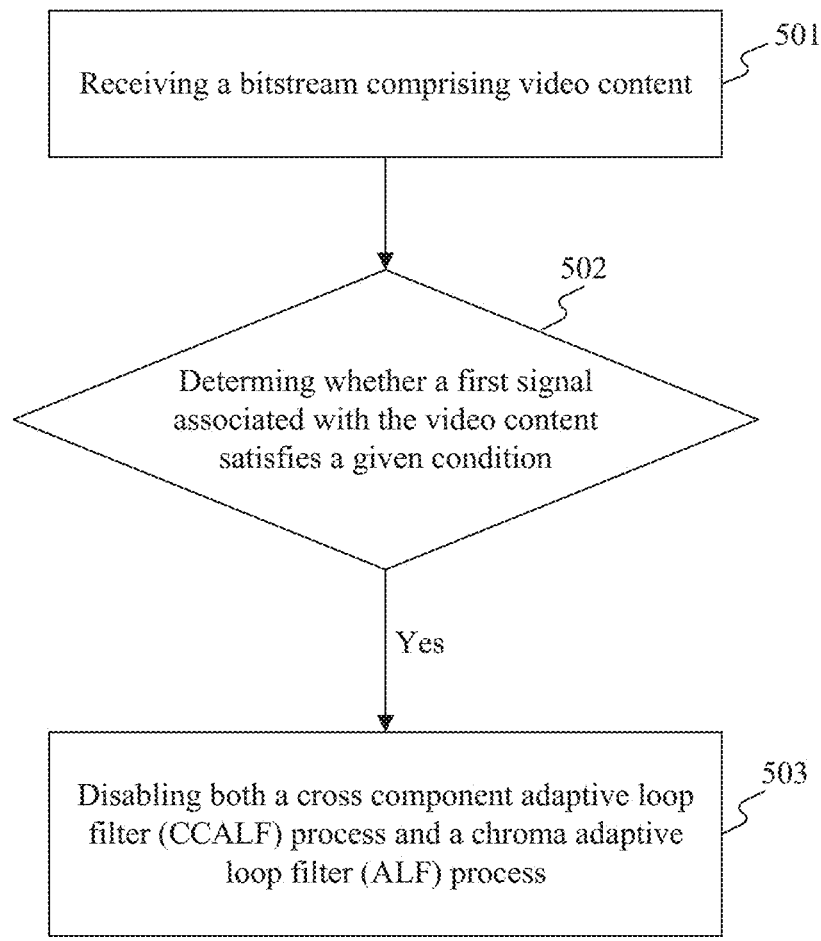
FIG. 5 illustrates a flowchart of an exemplary computer-implemented method for processing video content, consistent with some embodiments of the present disclosure.

FIG. 5 is a flowchart of an exemplary computer-implemented method for processing video content, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 5. In some embodiments, the method can be implemented by a computer program product, embodied in a computer-readable medium, including computer-executable instructions, such as program code, executed by computers (e.g., apparatus 400 of FIG. 4).

The method of FIG. 5 can include the following steps.

In step 501, a bitstream comprising video content is received by a decoder (e.g., by process 300A of FIG. 3A or 300B of FIG. 3B).

In step 502, it is determined whether a first signal associated with the video content satisfies a given condition. In some embodiments, the determination includes determining whether the first signal indicates an adaption parameter set (APS) network-abstraction-layer (NAL) unit being present in the received bitstream. For example, it is determined whether no_aps_constraint_flag syntax element is equal to 1, as the no_aps_constraint_flag syntax element being equal to 1 indicates there is no APS NAL unit.

In step 503, in response to the determination that the first signal satisfies the given condition, both a cross component adaptive loop filter (CCALF) process and a chroma adaptive loop filter (ALF) process are disabled. As described above, if the no_aps_constraint_flag syntax element is equal to 1, both CCALF and chroma ALF process are disabled.

In some embodiments, the CCALF process can be disabled at a sequence level. The definition of the no_aps_constraint_flag syntax element can be updated by including sps_ccalf_enabled_flag. The no_aps_constraint_flag syntax element being equal to 1 specifies that the sps_ccalf_enabled_flag can be equal to 0. The sps_ccalf_enabled_flag syntax element being equal to 0 specifies that the CCALF process is disabled and not applied in decoding of pictures in a CLVS associate with the video content in the received bitstream. In some embodiments, if the no_aps_constraint_flag syntax element is equal to 1, the value of sps_ccalf_enabled_flag can be equal to 0. If the no_aps_constraint_flag syntax element is equal to 0, no such constraints may be imposed.

In some embodiments, disabling the chroma ALF process at a slice level can be implemented by updating the definition of the no_aps_constraint_flag syntax element. The definition of the no_aps_constraint_flag syntax element can be updated by including sh_alf_cb_flag, sh_alf_cr_flag, and sh_num_alf_aps_ids_luma. For example, the no_aps_constraint_flag syntax element being equal to 1 specifies that the values of sh_alf_cb_flag, sh_alf_cr_flag, and sh_num_alf_aps_ids_luma of all slices in OlsInScope can be equal to 0. The value of sh_num_alf_aps_ids_luma is set to 0 to use fixed/default set of filters for luma ALF process. In some embodiments, if the no_aps_constraint_flag syntax element is equal to 1, the sh_alf_cb_flag syntax element, the sh_alf_cr_flag syntax element, and the sh_num_alf_aps_ids_luma syntax element are equal to 0. If the no_aps_constraint_flag syntax element is equal to 0, no such constraints may be imposed.

In some embodiments, disabling the chroma ALF process can be done in the picture level, instead of slice level. The definition of the no_aps_constraint_flag syntax element can be updated by including ph_alf_cb_flag, ph_alf_cr_flag, and ph_num_alf_aps_ids_luma. For example, the no_aps_constraint_flag syntax element being equal to 1 can specify that the values of ph_alf_cb_flag, ph_alf_cr_flag, and ph_num_alf_aps_ids_luma of all slices in OlsInScope can be equal to 0. The value of ph_num_alf_aps_ids_luma is set to 0 to use fixed/default set of filters for luma ALF process. In some embodiments, if the no_aps_constraint_flag syntax element is equal to 1, the ph_alf_cb_flag syntax element, the ph_alf_cr_flag syntax element, and the ph_num_alf_aps_ids_luma syntax element are equal to 0. If the no_aps_constraint_flag syntax element is equal to 0, no such constraints may be imposed.

As described above, the chroma ALF process can be disabled at the slice header level by updating the definition of the no_aps_constraint_flag syntax element. In some embodiments, the chroma ALF process can be controlled by providing a signal in the bitstream.

In some embodiments, the method can further include providing a second signal for controlling the chroma ALF process at a picture parameter set (PPS) level, a sequence parameter set (SPS) level, a picture header (PH) level, or a slice header (SH) level. The second signal can be an SPS level flag or a PPS level flag.

The Picture Header conveys information for a particular picture and contains information that is common to all slices that belong to the same picture. The SPS contains sequence-level information shared by all pictures in an entire coded layer video sequence (CLVS) and can provide a big picture of what a bitstream contains and how the information in the bitstream can be used. The SPS is at a higher level than the PH and the SH, the SPS level flag can be used to control the chroma ALF process at the SPS level, the PH level, or the SH level.

Similarly, the PPS contains syntax elements pertaining to a CLVS, the PPS is at a higher level than the PH and the SH, the PPS level flag can be used to control the chroma ALF process at the PPS level, the PH level, or the SH level.

In some embodiments, an SPS level flag (e.g., sps_chroma_alf_enabled_flag) is used to control the ALF process of the chroma component is used. For example, the sps_chroma_alf_enabled_flag syntax element being equal to 0 can specify that the adaptive loop filter is disabled and not applied in decoding of chroma component of the pictures in the CLVS. The sps_chroma_alf_enabled_flag syntax element being equal to 1 can specify that the adaptive loop filter is enabled and may be applied in decoding of the chroma component of the pictures in the CLVS. When not present, the value of sps_chroma_alf_enabled_flag is inferred to be equal to 0. It is appreciated that while this example provides various results based on the element being 0 or 1, it is appreciated that the indications of 0s and 1s are a design choice and that the outcomes can be reversed for this syntax element and other syntax elements (e.g., sps_chroma_alf_enabled_flag syntax element being equal to 0 can specify that the adaptive loop filter is enabled).

FIGS. 6-8 show example sequence parameter set (SPS), picture header (PH), slice header (SH) syntax tables of the proposed method, respectively. The following proposed changes can be made to the VVC specification or be implemented in other video coding technologies.

As shown in FIG. 6, the proposed flag sps_chroma_alf_enabled_flag (e.g., element 601) is conditionally signaled when sps_alf_enabled_flag is equal to 1 and ChromaArrayType !=0. In addition, the flag sps_ccalf_enabled_flag (e.g., element 602) is also conditionally signaled when sps_alf_enabled_flag is equal to 1 and ChromaArrayType !=0.

FIG. 7 introduces the ph_alf_aps_id_luma[i] syntax element, which specifies the aps_adaptation_parameter_set_id of the i-th ALF_APS that the luma component of the slices associated with the PH refers to. When the ph_alf_aps_id_luma[i] syntax element is present, the following applies:

The value of alf_luma_filter_signal_flag of the APS NAL unit having aps_params_type equal to ALF_APS and aps_adaptation_parameter_set_id equal to ph_alf_aps_id_luma[i] can be equal to 1.

The TemporalId of the APS NAL unit having aps_params_type equal to ALF_APS and aps_adaptation_parameter_set_id equal to ph_alf_aps_id_luma[i] can be less than or equal to the TemporalId of the picture associated with the PH.

When ChromaArrayType is equal to 0, the value of aps_chroma_present_flag of the APS NAL unit having aps_params_type equal to ALF_APS and aps_adaptation_parameter_set_id equal to ph_alf_aps_id_luma[i] can be equal to 0.

When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to ph_alf_aps_id_luma[i] can be equal to 0.

Moreover, in some embodiments of the present disclosure, when sps_chroma_alf_enabled_flag is equal to 0, the values of alf_chroma_filter_signal_flag of the APS NAL unit having aps_params_type equal to ALF_APS and aps_adaptation_parameter_set_id equal to ph_alf_aps_id_luma[i] can be equal to 0, as shown in element 701 of FIG. 7.

FIG. 8 introduces the sh_alf_aps_id_luma[i] syntax element, which the sh_alf_aps_id_luma[i] syntax element, which specifies the aps_adaptation_parameter_set_id of the i-th ALF_APS that the luma component of the slice refers to. When sh_alf_enabled_flag is equal to 1 and sh_alf_aps_id_luma[i] is not present, the value of sh_alf_aps_id_luma[i] is inferred to be equal to the value of ph_alf_aps_id_luma[i]. When sh_alf_aps_id_luma[i] is present, the following applies:

The TemporalId of the APS NAL unit having aps_params_type equal to ALF_APS and aps_adaptation_parameter_set_id equal to sh_alf_aps_id_luma[i] can be less than or equal to the TemporalId of the coded slice NAL unit.

The value of alf_luma_filter_signal_flag of the APS NAL unit having aps_params_type equal to ALF_APS and aps_adaptation_parameter_set_id equal to sh_alf_aps_id_luma[i] can be equal to 1.

When ChromaArrayType is equal to 0, the value of aps_chroma_present_flag of the APS NAL unit having aps_params_type equal to ALF_APS and aps_adaptation_parameter_set_id equal to sh_alf_aps_id_luma[i] can be equal to 0.

When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to sh_alf_aps_id_luma[i] can be equal to 0.

Moreover, in some embodiments of the present disclosure, when sps_chroma_alf_enabled_flag is equal to 0, the values of alf_chroma_filter_signal_flag of the APS NAL unit having aps_params_type equal to ALF_APS and aps_adaptation_parameter_set_id equal to sh_alf_aps_id_luma[i] can be equal to 0, as shown in element 801 in FIG. 8.

For some embodiments, by introducing the new SPS level flag sps_chroma_alf_enabled_flag syntax element in FIGS. 6-8, the definition of the no_aps_constraint_flag can be updated. For example, the no_aps_constraint_flag syntax element being equal to 1 specifies that there can be no NAL unit with nuh_unit_type equal to PREFIX_APS_NUT or SUFFIX_APS_NUT present in OlsInScope, and the sps_chroma_alf_enabled_flag (introduced in elements 601, 701, and 801 of FIGS. 6-8), sps_ccalf_enabled_flag (introduced in elements 602, 702, and 802 of FIGS. 6-8), sps_lmcs_enabled_flag and sps_scaling_list_enabled_flag can all be equal to 0. In some embodiments, if the no_aps_constraint_flag syntax element is equal to 1, the value of sh_num_alf_aps_ids_luma, of all slices in OlsInScope can be equal to 0. If the no_aps_constraint_flag syntax element is equal to 0, no such constraints may be imposed.

In some embodiments, a second signal (e.g., an PPS level flag) can also be introduced for controlling the chroma ALF process at the PPS level, the PH level, or the SH level. For example, the PPS level flag (e.g., pps_chroma_alf_enabled_flag) can be used to control the ALF process of a chroma component. The pps_chroma_alf_enabled_flag syntax element being equal to 0 can specify that the adaptive loop filter is disabled and not applied in decoding of chroma component of the pictures refer to the PPS. The pps_chroma_alf_enabled_flag syntax element being equal to 1 can specify that the adaptive loop filter is enabled and may be applied in decoding of the chroma component of the pictures refer to the PPS. When not present, the value of the pps_chroma_alf_enabled_flag syntax element is inferred to be equal to 0. It is appreciated that while this example provides various results based on the element being 0 or 1, it is appreciated that the indications of 0s and 1s are a design choice and that the outcomes can be reversed for this syntax element and other syntax elements (e.g., pps_chroma_alf_enabled_flag syntax element being equal to 0 can specify that the adaptive loop filter is enabled).

FIGS. 9-11 show example picture parameter set (PPS), picture header (PH), slice header (SH) syntax table of the proposed method, respectively. The following proposed changes can be made to the VVC specification or be implemented in other video coding technologies.

As shown in element 901 of FIG. 9, the proposed flag pps_chroma_alf_enabled_flag is conditionally signaled when pps_chroma_tool_offsets_present_flag is equal to 1.

FIG. 10 introduces the ph_alf_aps_id_luma[i] syntax element, which specifies the aps_adaptation_parameter_set_id of the i-th ALF_APS that the luma component of the slices associated with the PH refers to. When ph_alf_aps_id_luma[i] is present, the following applies:

- The value of alf_luma_filter_signal_flag of the APS NAL unit having aps_params_type equal to ALF_APS and aps_adaptation_parameter_set_id equal to ph_alf_aps_id_luma[i] can be equal to 1.
- The TemporalId of the APS NAL unit having aps_params_type equal to ALF_APS and aps_adaptation_parameter_set_id equal to ph_alf_aps_id_luma[i] can be less than or equal to the TemporalId of the picture associated with the PH.
- When ChromaArrayType is equal to 0, the value of aps_chroma_present_flag of the APS NAL unit having aps_params_type equal to ALF_APS and aps_adaptation_parameter_set_id equal to ph_alf_aps_id_luma[i] can be equal to 0.
- When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to ph_alf_aps_id_luma[i] can be equal to 0.
- Moreover, in some embodiments of the present disclosure, when pps_chroma_alf_enabled_flag is equal to 0, the values of alf_chroma_filter_signal_flag of the APS NAL unit having aps_params_type equal to ALF_APS and aps_adaptation_parameter_set_id equal to ph_alf_aps_id_luma[i] can be equal to 0, as shown in element 1001 in FIG. 10.

FIG. 11 introduces the ph_alf_aps_id_luma[i] syntax element, which specifies the aps_adaptation_parameter_set_id of the i-th ALF_APS that the luma component of the slices associated with the PH refers to. When ph_alf_aps_id_luma[i] is present, the following applies: the sh_alf_aps_id_luma[i] syntax element, which specifies the aps_adaptation_parameter_set_id of the i-th ALF_APS that the luma component of the slice refers to. When sh_alf_enabled_flag is equal to 1 and sh_alf_aps_id_luma[i] is not present, the value of sh_alf_aps_id_luma[i] is inferred to be equal to the value of ph_alf_aps_id_luma[i]. When sh_alf_aps_id_luma[i] is present, the following applies:

- The TemporalId of the APS NAL unit having aps_params_type equal to ALF_APS and aps_adaptation_parameter_set_id equal to sh_alf_aps_id_luma[i] can be less than or equal to the TemporalId of the coded slice NAL unit.
- The value of alf_luma_filter_signal_flag of the APS NAL unit having aps_params_type equal to ALF_APS and aps_adaptation_parameter_set_id equal to sh_alf_aps_id_luma[i] can be equal to 1.
- When ChromaArrayType is equal to 0, the value of aps_chroma_present_flag of the APS NAL unit having aps_params_type equal to ALF_APS and aps_adaptation_parameter_set_id equal to sh_alf_aps_id_luma[i] can be equal to 0.
- When sps_ccalf_enabled_flag is equal to 0, the values of alf_cc_cb_filter_signal_flag and alf_cc_cr_filter_signal_flag of the APS NAL unit having aps_params_type equal to ALF_APS and aps_adaptation_parameter_set_id equal to sh_alf_aps_id_luma[i] can be equal to 0.
- Moreover, in some embodiments of the present disclosure, when pps_chroma_alf_enabled_flag is equal to 0, the values of alf_chroma_filter_signal_flag of the APS NAL unit having aps_params_type equal to ALF_APS and aps_adaptation_parameter_set_id equal to sh_alf_aps_id_luma[i] can be equal to 0, as shown in element 1101 of FIG. 11.

For some embodiments, by introducing the new PPS level flag pps_chroma_alf_enabled_flag syntax element in FIGS. 9-11, the definition of the no_aps_constraint_flag can be updated. For example, the no_aps_constraint_flag syntax element being equal to 1 specifies that there can be no NAL unit with nuh_unit_type equal to PREFIX_APS_NUT or SUFFIX_APS_NUT present in OlsInScope, and the pps_chroma_alf_enabled_flag (introduced in elements 901, 1001, and 1101 of FIGS. 9-11), sps_ccalf_enabled_flag (introduced in elements 902, 1002, and 1102 of FIGS. 9-11), sps_lmcs_enabled_flag and sps_scaling_list_enabled_flag can all be equal to 0. In some embodiments, if no_aps_constraint_flag syntax element is equal to 1, the value of sh_num_alf_aps_ids_luma, of all slices in OlsInScope can be equal to 0. If the no_aps_constraint_flag syntax element is equal to 0, no such constraints may be imposed.

In some embodiments, a semantic constraint is applied to the no_aps_constraint_flag to disable both ALF and CCALF. For example, the no_aps_constraint_flag syntax element being equal to 1 can specify that there can be no NAL unit with nuh_unit_type equal to PREFIX_APS_NUT or SUFFIX_APS_NUT present in OlsInScope, and the sps_alf_enabled_flag, sps_ccalf_enabled_flag, sps_lmcs_enabled_flag and sps_scaling_list_enabled_flag can all be equal to 0. In some embodiments, if the no_aps_constraint_flag syntax element is equal to 1, the values of sps_alf_enabled_flag, sps_ccalf_enabled_flag, sps_lmcs_enabled_flag and sps_scaling_list_enabled_flag can all be 0. If the no_aps_constraint_flag syntax element is equal to 0, no such constraints may be imposed.

The second drawback of the current design of VVC is related to disabling transform-skip residual coding (TSRC). Disabling TSRC is prevented under either of the following two scenarios.

In the first scenario, enabling Dependent Quantization (DQ) or Sign Data Hiding (SDH) for a slice can cause that TSRC disabling is prevented.

In the second scenario, a flag related to TSRC constraint can be used to prevent TSRC disabling.

Both of the above scenarios are to be addressed such that the TSRC can be disabled when needed.

In the first scenario, enabling either DQ or SDH for the slice can prevent disabling TSRC. Specifically, according to slice header syntax of the current VVC design, a TSRC disabling flag (i.e, sh_ts_residual_coding_disabled_flag) is set to 0 when either of a slice-level DQ flag (i.e., sh_dep_quant_used_flag) or a slice-level SDH flag (i.e., sh_sign_data_hiding_used_flag) is equal to 1.

Setting the sh_dep_quant_used_flag syntax element to 0 can disable the TSRC. According to the definition of the sh_dep_quant_used_flag syntax element, the sh_ts_residual_coding_disabled_flag syntax element being equal to 0 specifies that the residual_ts_coding( ) syntax structure is used to parse the residual samples of a transform skip block for the current slice. In addition, the sh_dep_quant_used_flag syntax element being equal to 1 specifies that dependent quantization is used for the current slice. The sh_sign_data_hiding_used_flag syntax element being equal to 1 specifies that sign bit hiding is used for the current slice. Both the sh_dep_quant_used_flag syntax element and the sh_sign_data_hiding_used_flag syntax element being equal to 0 is required for TSRC to be disabled. Enabling either the DQ or the SDH for the slice can cause prevention of TSRC disabling.

In the second scenario, the no_tsrc_constraint_flag syntax element can be used to disallow TSRC disabling by setting a TSRC disabling flag to 0. Specifically, the no_tsrc_constraint_flag syntax element being equal to 1 specifies that sh_ts_residual_coding_disabled_flag can be equal to 0. The no_tsrc_constraint_flag syntax element being equal to 0 does not impose such a constraint. As described, the sh_ts_residual_coding_disabled_flag syntax element being equal to 0 specifies that the residual_ts_coding( ) syntax structure is used to parse the residual samples of a transform skip block for the current slice. If the sh_ts_residual_coding_disabled_flag syntax element is set to 0, the TSRC is enabled.

In the conventional VVC video coding design, for a given slice, TSRC can be disabled (e.g., sh_ts_residual_coding_disabled_flag is 1) if all of the following conditions are satisfied:
  Dependent quantization (DQ) is disabled (sh_dep_quant_used_flag==0) AND
  sign data hiding (SDH) is disabled (sh_sign_data_hiding_used_flag==0) Disabling both the DQ and the SDH can disable the TSRC, while enabling either of the DQ or the SDH can prevent disabling the TSRC.

In some embodiments of the present disclosure, constraints are applied to the no_tsrc_constraint_flag syntax element for disabling certain features such as TSRC. For example, the following embodiments are proposed to disallow the following two combinations.
  no_tsrc_constraint_flag is equal to 1 and DQ is enabled,
  no_tsrc_constraint_flag is equal to 1 and SDH is enabled.

The proposed methods are provided to address the situation when TSRC disabling is prevented. In some embodiments of the present disclosure, constraints are applied to the no_tsrc_constraint_flag syntax element and the syntax elements related to the DQ and the SDH for disabling TSRC. The current syntax elements are updated to provide the feature of TSRC disabling with better code efficiency.

Figure 12:
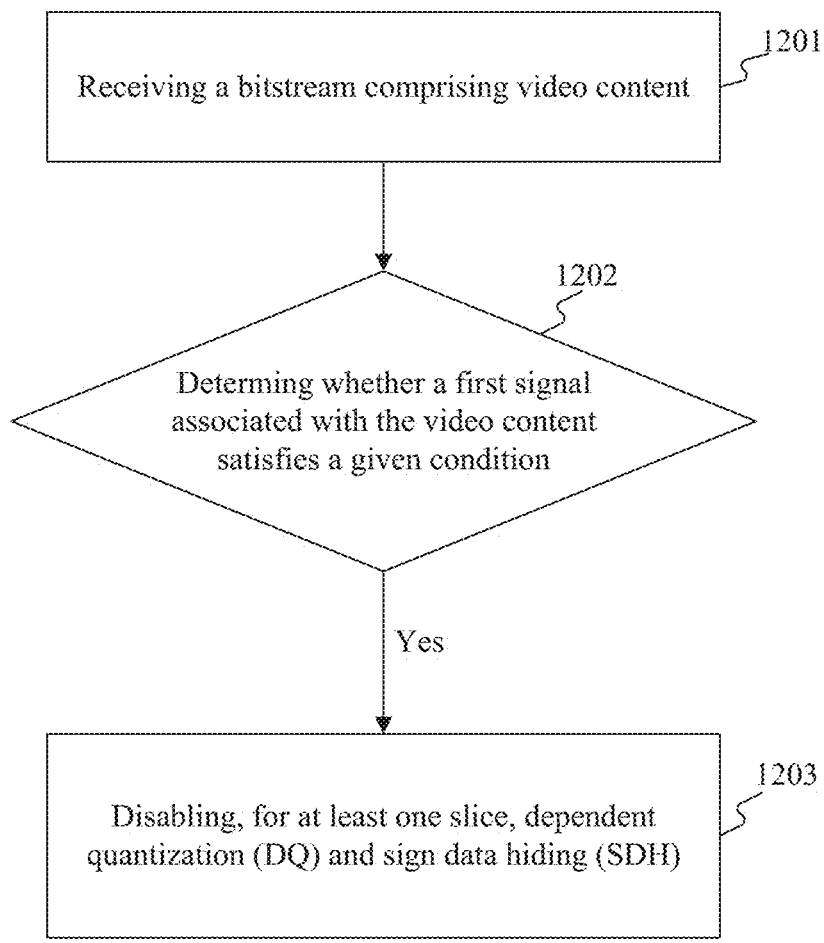
FIG. 12 illustrates a flowchart of an exemplary computer-implemented method for processing video content, consistent with some embodiments of the present disclosure.
Figure 18E:

For example, FIG. 12 is a flowchart of an exemplary computer-implemented method for processing video content, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method. In some embodiments, the method can be implemented by a computer program product, embodied in a computer-readable medium, including computer-executable instructions, such as program code, executed by computers (e.g., apparatus 400 of FIG. 4). The method can include the following steps.

In step 1201, a bitstream comprising video content is received by, e.g., a decoder.

In step 1202, it is determined whether a first signal associated with the video content satisfies a given condition. The first signal can be the no_tsrc_constraint_flag syntax element. In some embodiments, it is determined whether the no_tsrc_constraint_flag syntax element is equal to 1.

In step 1203, in response to the determination that the first signal satisfies the given condition, disabling, for at least one slice, dependent quantization (DQ) and sign data hiding (SDH). For example, when it is determined that the no_tsrc_constraint_flag syntax element is equal to 1, the DQ and the SDH are disabled for at least one slice.

In some embodiments, the method can further comprise in response to the determination that the first signal satisfies the given condition, disabling, for at least one slice, transform-skip residual coding (TSRC). For example, when it is determined that the no_tsrc_constraint_flag syntax element is equal to 1, a TSRC disabling flag is set to 1.

In some embodiments, the DQ and the SDH can be disabled at an SPS level or an SH level. In some embodiments, the DQ and the SDH can be disabled for all slices.

At the SPS level, disabling of the DQ and the SDH is applied to all slices. In some embodiments, the definition of no_tsrc_constraint_flag syntax element can be updated with constraints related to SPS level DQ and SDH syntax elements. In some embodiments, both definitions of the SPS level DQ and SDH syntax elements can be updated with constrains related to the no_tsrc_constraint_flag syntax element. In some embodiments, SPS syntax can be updated with conditional signaling between the no_tsrc_constraint_flag syntax element and the SPS level DQ and SDH syntax elements.

At the SH level, the definition of no_tsrc_constraint_flag syntax element can be updated with constraints related to SH level DQ and SDH syntax elements for all slices. In some embodiments, both definitions of the SH level DQ and SDH syntax elements for a slice can be updated with constrains related to the no_tsrc_constraint_flag syntax element, where disabling of the DQ and the SDH is applied to the slice. In some embodiments, SH syntax can be updated with conditional signaling between the no_tsrc_constraint_flag syntax element and the SH level DQ and SDH syntax elements for a slice, where disabling of the DQ and the SDH is applied to the slice. At the SH level, as described above, disabling of the DQ and the SDH can be applied to either all slices or a given slice.

The following proposed changes can be made to the VVC specification or be implemented in other video coding technologies.

In some embodiments, a semantic constraint is applied to no_tsrc_constraint_flag to disable the DQ and the SDH at a SPS level. Therefore, the following proposed changes of the semantic of the no_tsrc_constraint_flag can be made to the VVC specification or be implemented in other video coding technologies. For example, the no_tsrc_constraint_flag syntax element being equal to 1 can specify that sh_ts_residual_coding_disabled_flag can be equal to 1 and sps_dep_quant_enabled_flag and sps_sign_data_hiding_enabled_flag can both be equal to 0. In some embodiments, if the no_tsrc_constraint_flag syntax element is equal to 1, the sh_ts_residual_coding_disabled_flag syntax element, the sps_dep_quant_enabled_flag syntax element, and the sps_sign_data_hiding_enabled_flag syntax element are equal to 0. If the no_tsrc_constraint_flag syntax element is equal to 0, no such constraints may be imposed. At the SPS level, disabling of the DQ and SDH is applied to all slices.

In some embodiments, a semantic constraint is applied to no_tsrc_constraint_flag to disable DQ and SDH in all of the slices of the CLVS. Therefore, the following proposed changes of the semantic of the no_tsrc_constraint_flag can be made to the VVC specification or be implemented in other video coding technologies. For example, the no_tsrc_constraint_flag syntax element being equal to 1 can specify that sh_ts_residual_coding_disabled_flag can be equal to 1 and sh_dep_quant_used_flag and sh_sign_data_hiding_used_flag can both be equal to 0 for all slices. In some embodiments, if the no_tsrc_constraint_flag syntax element is equal to 1, the sh_ts_residual_coding_disabled_flag syntax element, the sh_dep_quant_used_flag syntax element, and the sh_sign_data_hiding_used_flag syntax element are equal to 0. If the no_tsrc_constraint_flag syntax element is equal to 0, no such constraints may be imposed.

In some embodiments, a semantic constraint is applied to both sps_dep_quant_enabled_flag and sps_sign_data_hiding_enabled_flag to disable the DQ and the SDH at the SPS level. The following proposed changes of the semantic of the sps_dep_quant_enabled_flag and the sps_sign_data_hiding_enabled_flag can be made to the VVC specification or be implemented in other video coding technologies. For example, the sps_dep_quant_enabled_flag syntax element being equal to 0 can specify that the dependent quantization is disabled and not used for pictures referring to the SPS. The sps_dep_quant_enabled_flag syntax element being equal to 1 can specify that the dependent quantization is enabled and may be used for pictures referring to the SPS. In some embodiments, when the value of no_tsrc_constraint_flag is equal to 1, the value of sps_dep_quant_enabled_flag can be equal to 0. For example, sps_sign_data_hiding_enabled_flag syntax element being equal to 0 specify s that sign bit hiding is disabled and not used for pictures referring to the SPS. The sps_sign_data_hiding_enabled_flag syntax element being equal to 1 specify that sign bit hiding is enabled and may be used for pictures referring to the SPS. When sps_sign_data_hiding_enabled_flag is not present, it is inferred to be equal to 0. In some embodiments, when the value of no_tsrc_constraint_flag is equal to 1, the value of sps_sign_data_hiding_enabled_flag can be equal to 0. The DQ and the SDH can be disabled at the SPS level for all slices according to the updated definitions of the sps_dep_quant_enabled_flag syntax element and the sps_sign_data_hiding_enabled_flag syntax element.

In some embodiments, a semantic constraint is applied to slice level DQ flag (e.g., sh_dep_quant_used_flag) and SDH flag (e.g., sh_sign_data_hiding_used_flag). For example, the sh_dep_quant_used_flag syntax element being equal to 0 can specify that dependent quantization is not used for the current slice. The sh_dep_quant_used_flag syntax element being equal to 1 can specify that dependent quantization is used for the current slice. When sh_dep_quant_used_flag is not present, it is inferred to be equal to 0. In some embodiments, when the value of no_tsrc_constraint_flag is equal to 1, the value of sh_dep_quant_used_flag can be equal to 0. For example, the sh_sign_data_hiding_used_flag syntax element being equal to 0 can specify that sign bit hiding is not used for the current slice. The sh_sign_data_hiding_used_flag syntax element being equal to 1 can specify that sign bit hiding is used for the current slice. When sh_sign_data_hiding_used_flag is not present, it is inferred to be equal to 0. In some embodiments, when the value of no_tsrc_constraint_flag is equal to 1, the value of sh_sign_data_hiding_used_flag can be equal to 0. The DQ and the SDH can be disabled at the SH level for the current slice.

In the following embodiments of the present disclosure, the SPS syntax table can be updated with conditional signaling for disabling the TSRC. In some embodiments, the SH syntax table can be updated with conditional signaling for disabling the TSRC.

At the SPS level or at the SH level, according to SPS syntax table and SH syntax table, the SDH can be enabled when the DQ is disabled. To prevent the disabled DQ from enabling the DQ, the first signal is used to disable the SDH after the DQ is disabled. In some embodiments, in response to the determination that the first signal satisfies the given condition, determining whether the DQ is disabled for the at least one slice, in response to the DQ being disabled, disabling the SDH for the at least one slice. For example, when it is determined that the no_tsrc_constraint_flag syntax element is equal to 1, it is determined whether the DQ is disabled. When it is determined the DQ is disabled, the SDH is disabled.

In some embodiments, the SPS syntax table is updated for disabling the TSRC for all slices. FIG. 13 shows the SPS syntax table of the proposed method. For example, sps_dep_quant_enabled_flag and sps_sign_data_hiding_enabled_flag are conditionally signaled when no_tsrc_constraint_flag is equal to 0. The following proposed changes of SPS syntax table can be made to the VVC specification or be implemented in other video coding technologies. For example, as shown in element 1301 and element 1302 of FIG. 13, the syntax of "!no_tsrc_constraint_flag" is added. When the no_tsrc_constraint_flag syntax element is equal to 1, the value of "!no_tsrc_constraint_flag" is equal to 0, and the value of sps_dep_quant_enabled_flag is set to 0. The sps_dep_quant_enabled_flag syntax element being equal to 0 specifies the dependent quantization is disabled for all slices at the SPS level. In element 1302, when the no_tsrc_constraint_flag syntax element is equal to 1, the value of "!no_tsrc_constraint_flag" is equal to 0, even though "!sps_dep_quant_enabled_flag" is equal to 1, the value of sps_sign_data_hiding_enabled_flag is still set to 0. The sps_sign_data_hiding_enabled_flag syntax element being equal to 0 specifies the sign data hiding is disabled for all slices at the SPS level.

As described, TSRC for a slice can be disabled if both the DQ and the SDH are disabled for the slice. As both the DQ and the SDH are disabled for all slices, the TSRC is disabled for all slices.

In some embodiments, the SH syntax table is updated for disabling the TSRC for a slice. FIG. 14 shows the SH syntax table of the proposed method. For example, slice level DQ sh_dep_quant_used_flag and SDH sh_sign_data_hiding_used_flag are conditionally signaled when no_tsrc_constraint_flag is equal to 0. As shown in element 1401 and element 1402 of FIG. 14, "!no_tsrc_constraint_flag" is added in the syntax. When the no_tsrc_constraint_flag syntax element is equal to 1, the sh_dep_quant_used_flag syntax element is set to 0. As shown in element 1402, when the no_tsrc_constraint_flag syntax element is equal to 1, even though the value of "! sh_sign_data_hiding_used_flag" is 1, the sh_sign_data_hiding_used_flag syntax element is still set to 0. As sh_ts_residual_coding_disabled_flag is conditionally signaled when both the sh_dep_quant_used_flag syntax element and the sh_sign_data_hiding_used_flag syntax element are equal to 0, the sh_ts_residual_coding_disabled_flag syntax element is set to 1.

In some embodiment, a semantic constraint is applied to no_tsrc_constraint_flag to disable transform skip mode. For example, no_tsrc_constraint_flag syntax element being equal to 1 can specify that sps_transform_skip_enabled_flag and sh_ts_residual_coding_disabled_flag can be equal to 0. In some embodiments, if the no_tsrc_constraint_flag syntax element is equal to 1, the sps_transform_skip_enabled_flag syntax element is equal to 0. If the no_tsrc_constraint_flag syntax element is equal to 0, no such constraints may be imposed.

In some embodiments, general constraint syntax is updated by removing the no_tsrc_constraint_flag syntax element. It is noted that disabling the DQ or the SDH may impact coding efficiency. If transform skip is disabled at the SPS level, the TSRC can be disabled. A constraint flag "no_transform_skip_constraint_flag" can be used to disable transform skip mode. The no_transform_skip_constraint_flag syntax element being equal to 1 can specify that transform skip mode is disabled. When no_transform_skip_constraint_flag syntax element is equal to 1, since there is no transform skip mode, TSRC is implicitly disabled. Therefore, the functionality of no_tsrc_constraint_flag is overlapped with that of no_transform_skip_constraint_flag. To disable the TSRC, the no_tsrc_constraint_flag syntax element can be removed from example general constraint syntax as shown in FIG. 15 and the no_transform_skip_constraint_flag syntax element can be used without the need of disabling DQ and SDH.

The third drawback of the current VVC design is directed to syntax order. For example, in the VVC draft 9, the syntax order is not in modular form. In the SPS syntax table, the transform related syntax is scattered in different places of the syntax table. In the picture header (PH) and the slice header (SH), some of the syntax elements of in-loop filters are in top part of the syntax table, whereas some others are in the bottom part of the syntax table.

In some embodiments, as shown in FIG. 16A-H, the syntax elements of the SPS syntax table are ordered in such a way that all transform related syntax elements are placed together. The syntax elements related to maximum transform size (e.g., element 1601 in FIG. 16C), transform-skip, (e.g., element 1602 in FIG. 16D), and multiple transform sets (MTS) (e.g., element 1603 in FIG. 16D), and low frequency non-separable transform (LFNST) (e.g., element 1604 in FIG. 16D) are signaled consecutively in example SPS syntax table. Similarly, sps_lmcs_enabled_flag (e.g., element 1605 in FIG. 16D) is signaled right after signaling of sps_ccalf_enabled_flag. The syntax elements marked with strikethroughs are where the syntax elements were before re-ordering.

In some embodiments, picture header (PH) syntax is re-ordered as shown in FIG. 17A-F. For example, picture header (PH) syntax elements related to SAO and deblocking process are signaled right after ALF and LMCS related syntax being signaled, as shown in element 17011 and 17012 in FIG. 17B-C. The syntax elements marked with strikethroughs are where the syntax elements were before re-ordering.

In some embodiments, the slice header (SH) syntax is re-ordered as shown in FIG. 18A-E. For example, slice header syntax elements related to SAO and deblocking process (e.g., element 1801 in FIG. 18B) are signaled right after ALF and LMCS related syntax. The syntax elements marked with strikethroughs are where the syntax elements were before re-ordering. It is appreciated that the above embodiments may be combined during implementation.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method of decoding a bitstream to output one or more pictures for a video stream, the method comprising:
   receiving a bitstream associated with video content, wherein the bitstream does not comprise adaptation parameter set (APS) network-abstraction-layer (NAL) unit;
   decoding, using coded information of the bitstream, one or more pictures,
   wherein the decoding comprises:
       determining whether the APS NAL unit is present in the bitstream; and in response to the determination that the APS NAL unit is not present in the bitstream, disabling both a cross component adaptive loop filter (CCALF) process and a chroma adaptive loop filter (ALF) process; and performing a luma ALF process based on a slice-level flag associated with a predetermined set of filters, wherein disabling the CCALF process further comprises:

decoding a first sequence-level flag indicating that the CCALF process is disabled for a video sequence associated with the sequence-level flag; and decoding a second sequence-level flag indicating that luma mapping with chroma scaling (LMCS) is disabled for the video sequence, wherein the decoding of the second sequence-level flag is immediately after the decoding of the first sequence-level flag.

2. The method according to claim 1, wherein the determining of whether the APS NAL unit is present in the bitstream is based on a first signal in the bitstream.

3. The method according to claim 1, further comprising: receiving a second signal for controlling the chroma ALF process at a picture parameter set level, a sequence parameter set level, a picture header level, or a slice header level.

4. The method according to claim 3, wherein the second signal indicates whether the chroma ALF process is enabled in decoding of chroma components of pictures in a coded layer video sequence (CLVS) associated with the video content.

5. The method according to claim 3, wherein the second signal indicates whether the chroma ALF process is enabled in decoding of chroma components of pictures referring to a picture parameter set (PPS) associated with the video content.

6. A method of encoding a video sequence into a bitstream, the method comprising:

receiving a video sequence;
encoding one or more pictures of the video sequence; and
generating a bitstream,
wherein the encoding comprises:
encoding a first flag indicating whether adaption parameter set (APS) network-abstraction-layer (NAL) unit is present in the bitstream; and
in response to the first flag indicating that the APS NAL unit is not present in the bitstream, encoding a set of flags disabling both a cross component adaptive loop filter (CCALF) process and a chroma adaptive loop filter (ALF) process; and
encoding a slice-level flag associated with a predetermined set of filters, the predetermined set of filters being used for performing a luma ALF process,
wherein the set of flags comprises:
a first sequence-level flag indicating that the CCALF process is disabled for a video sequence associated with the first sequence-level flag; and
a second sequence-level flag indicating that luma mapping with chroma scaling (LMCS) is disabled for the video sequence,
wherein the first and second sequence-level flags are both encoded into the bitstream, and the second sequence-level flag is signaled immediately after the first sequence-level flag.

7. The method of claim 6, further comprising:
in response to the first signal having a first value, encoding the set of flags disabling both the CCALF process and the ALF process.

8. The method of claim 6, wherein the set of flags comprises a second flag, and the method further comprises:
setting a value of the second flag to disable the chroma ALF process at a picture parameter set level, a sequence parameter set level, a picture header level, or a slice header level.

9. The method of claim 8, wherein
the second flag indicates whether the chroma ALF process is enabled for chroma components of pictures in a coded layer video sequence (CLVS) associated with the video content.

10. The method of claim 8, wherein
the second flag indicates whether the chroma ALF process is enabled for chroma components of pictures referring to a picture parameter set (PPS) associated with the video content.

11. The method according to claim 2, wherein the first signal is a flag, and the method further comprises:
in response to the flag having a value equal to 1, determining that the APS NAL unit is not present in the received bitstream.

12. The method according to claim 1, wherein disabling the chroma ALF process further comprises:
receiving one or more slice-level flags indicating that the chroma ALF process is disabled for a video slice associated with the one or more slice-level flags.

13. The method according to claim 12, wherein the first and second sequence-level flags are signaled in a sequence parameter set (SPS).

14. The method of claim 7, wherein the first value is equal to 1.

15. The method of claim 6, wherein the set of flags comprises:
one or more slice-level flags indicating that the chroma ALF process is disabled for a video slice associated with the one or more slice-level flags.

16. The method according to claim 15, wherein the first sequence-level level flags are signaled in a sequence parameter set (SPS).

17. A non-transitory computer readable medium storing a bitstream associated with video content, wherein the bitstream comprises:
a flag indicating that adaption parameter set (APS) network-abstraction-layer (NAL) unit is not present in the bitstream;
a first sequence-level flag indicating that a cross component adaptive loop filter (CCALF) process is disabled;
a second sequence-level flag indicating that luma mapping with chroma scaling (LMCS) is disabled;
one or more slice-level flags indicating that a chroma adaptive loop filter (ALF) process is disabled;
a slice-level flag indicating that a luma ALF process is enabled; and
a slice-level flag indicating that a predetermined set of filters is used for the luma ALF process,
wherein second sequence-level flag is signaled immediately after the first sequence-level flag.

18. The non-transitory computer readable medium of claim 17, wherein the bitstream further comprises:
a sequence parameter set (SPS), wherein the first and second sequence-level flags are signaled in the SPS.

* * * * *